United States Patent
Hopkins et al.

(10) Patent No.: US 10,213,969 B2
(45) Date of Patent: Feb. 26, 2019

(54) INTEGRATED SMART SUSCEPTOR HEATER BLANKET AND VACUUM BAG DEPLOYMENT SYSTEM FOR LARGE COMPOSITE SKIN LAMINATE DEBULK

(71) Applicant: The Boeing Company, Chicago, IL (US)

(72) Inventors: Andrew M. Hopkins, Salt Lake City, UT (US); Joshua P. Carlsen, Riverton, UT (US); Taylor M. Williamson, Riverton, UT (US); Jeff D. Eastin, Tooele, UT (US); Robert D. Dennis, West Jordan City, UT (US); Thomas D. Wilson, Auburn, WA (US); Bianca M. Moran, Salt Lake City, UT (US); Kari P. Larkin, West Bountiful, UT (US); John R. Henry, Sandy, UT (US); Isaac K. Jacob, Orem, UT (US); James M. Kestner, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 123 days.

(21) Appl. No.: 15/056,509

(22) Filed: Feb. 29, 2016

(65) Prior Publication Data

US 2017/0246816 A1    Aug. 31, 2017

(51) Int. Cl.
*B29C 70/34* (2006.01)
*H05B 6/10* (2006.01)
(Continued)

(52) U.S. Cl.
CPC ............ *B29C 70/342* (2013.01); *B29C 35/02* (2013.01); *B29C 35/0805* (2013.01); *H05B 3/34* (2013.01);
(Continued)

(58) Field of Classification Search
CPC ... B29C 70/342; B29C 35/0805; B29C 35/02; B29C 2035/0211; B29C 2035/0816;
(Continued)

(56) References Cited

U.S. PATENT DOCUMENTS

| | | | | |
|---|---|---|---|---|
| 3,308,321 A | * | 3/1967 | Provost, Jr. | H01R 39/58 310/239 |
| 4,133,711 A | * | 1/1979 | August | B29C 70/545 156/353 |

(Continued)

FOREIGN PATENT DOCUMENTS

| | | |
|---|---|---|
| EP | 2471649 A1 | 7/2012 |
| EP | 2511080 A1 | 10/2012 |
| GB | 940407 A | 10/1963 |

OTHER PUBLICATIONS

Extended European Search Report dated Jul. 17, 2017, in EP Application No. 171572753, 6 pages.
(Continued)

*Primary Examiner* — Michael N Orlando
*Assistant Examiner* — Christian Roldan
(74) *Attorney, Agent, or Firm* — MH2 Technology Law Group LLP

(57) ABSTRACT

A processing apparatus such as a heating and/or debulking apparatus that may be used to debulk a plurality of uncured composite layers to form an article such as an aircraft component may include a plurality of interconnected smart susceptor heater blankets. The plurality of smart susceptor heater blankets may be connected in series or in parallel, and may be controlled to uniformly heat the component during formation. The plurality of smart susceptor heater blankets may be supported by a deployment system that lowers the plurality of smart susceptor heater blankets toward, and raises the plurality of smart susceptor heater blankets away from, a working surface.

20 Claims, 20 Drawing Sheets

(51) Int. Cl.
  *B29C 35/08* (2006.01)
  *B29C 35/02* (2006.01)
  *H05B 3/34* (2006.01)
  *B29K 105/08* (2006.01)
  *B29L 31/30* (2006.01)

(52) U.S. Cl.
  CPC ...... *H05B 6/105* (2013.01); *B29C 2035/0211* (2013.01); *B29C 2035/0811* (2013.01); *B29C 2035/0816* (2013.01); *B29K 2105/089* (2013.01); *B29L 2031/3076* (2013.01); *H05B 2203/003* (2013.01); *H05B 2203/007* (2013.01); *H05B 2206/023* (2013.01)

(58) Field of Classification Search
  CPC .... H05B 6/105; H05B 3/34; H05B 2203/003; B29L 2031/3076; B29K 2105/089
  See application file for complete search history.

(56) References Cited

U.S. PATENT DOCUMENTS

| | | | | |
|---|---|---|---|---|
| 4,859,511 | A * | 8/1989 | Patterson | B29C 33/64 428/212 |
| 5,328,540 | A * | 7/1994 | Clayton | B29C 33/34 156/285 |
| 6,229,126 | B1 * | 5/2001 | Ulrich | C21D 1/42 219/635 |
| 8,330,086 | B2 | 12/2012 | Miller et al. | |
| 8,884,201 | B2 | 11/2014 | Matsen et al. | |
| 9,174,398 | B2 | 11/2015 | Miller et al. | |
| 2008/0251642 | A1 * | 10/2008 | Boschet | B64D 15/12 244/134 D |
| 2012/0145702 | A1 * | 6/2012 | Miller | B29C 73/30 219/618 |
| 2012/0145703 | A1 | 6/2012 | Matsen et al. | |
| 2012/0288583 | A1 * | 11/2012 | Segura Moreno | B29B 11/16 425/501 |
| 2013/0082047 | A1 | 4/2013 | Matsen et al. | |

OTHER PUBLICATIONS

Extended European Search Report dated Jul. 19, 2017, in EP Application No. 17157477.5, 8 pages.

Kestner et al., "Susceptor Wire Array", U.S. Appl. No. 14/640,227, filed Mar. 6, 2015.

Miller et al., "Parallel Wire Conductor for Use With a Heating Blanket", U.S. Appl. No. 14/640,217, filed Mar. 6, 2015.

Kestner et al., "Large Scale Smart Susceptor Heater Blankets Requiring Multi Zone Control", U.S. Appl. No. 15/056,297, filed Feb. 29, 2016.

Hopkins et al., "Integrated Smart Susceptor Heater Blanket Debulk System for Composites", U.S. Appl. No. 15/056,783, filed Feb. 29, 2016.

* cited by examiner

INTEGRATED SMART SUSCEPTOR HEATER BLANKET AND VACUUM BAG DEPLOYMENT SYSTEM FOR LARGE COMPOSITE SKIN LAMINATE DEBULK

TECHNICAL FIELD

The present teachings relate to the manufacture of laminated composite materials that include a debulk of an uncured composite laminate to form, for example, a component for an aircraft, aerospace vehicle, or other vehicle.

BACKGROUND

Manufacturing components for vehicles such as aircraft and aerospace vehicles, ground vehicles, etc., from fiber sheets is well known. A composite part including a plurality of composite plies or sheets that are pre-impregnated with an uncured resin (i.e., prepregs) may be assembled during a layup process. During layup, several (i.e., 20, 40, or more) uncured composite plies are stacked, and then air that may be trapped between each of the several plies may be removed using a vacuum during a "debulk" process. Subsequently, the resin may be cured in an oven or an autoclave. During the curing of the resin, the component is supported on a cure tool that maintains the shape of the component while heat is applied to the component to cure the resin.

The debulking and curing of the plurality of composite plies may be performed in an autoclave. Additionally, techniques have been developed for debulking composite parts without the need for an oven or autoclave. For example, a plurality of uncured composite plies may be placed into a vacuum bag and heated to a temperature below the cure temperature. A vacuum is applied to the vacuum bag to remove air from between each adjacent ply. The debulked composite part may then be removed from the vacuum bag and processed such that it is ready to be heated to a cure temperature within an autoclave.

Debulking of components through the application of heat within a vacuum bag is convenient and cost effective for smaller parts. A relatively small heater blanket may be manufactured at reasonable cost and used to debulk smaller components. However, this approach may not be suitable for some components such as aircraft components (e.g., horizontal stabilizers) which may be manufactured as a large single seamless structure.

Accordingly, there is a need for a method and apparatus for OOA debulking of composite parts out-of-autoclave that employ relatively simple and inexpensive cure tooling. There is also a need for a method and apparatus of the type mentioned above that is well suited for processing relatively large scale parts out-of-autoclave using induction heating and smart susceptors to provide precise and uniform temperature control during the debulk process.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a heater blanket deployment system can include a first workstation including a first heater blanket assembly including a first smart susceptor heater blanket, a second smart susceptor heater blanket positioned adjacent to the first smart susceptor heater blanket, and a first working surface configured such that during processing of a first workpiece, the first smart susceptor heater blanket and the second smart susceptor heater blanket are configured to overlie the first working surface. The deployment system may further include a second workstation having a second heater blanket assembly having a third smart susceptor heater blanket, a fourth smart susceptor heater blanket positioned adjacent to the third smart susceptor heater blanket, and a second working surface configured such that during processing of a second workpiece, the third smart susceptor heater blanket and the fourth smart susceptor heater blanket are configured to overlie the second working surface. The deployment system may further include a frame supporting the first heater blanket assembly and the second heater blanket assembly, and at least one power supply configured to supply power to the first workstation and to the second workstation from the frame.

In an embodiment, the frame may be configured such that the first heater blanket assembly can move toward and away from the first working surface, and further configured such that the second heater blanket assembly can move toward and away from the second working surface. The frame may further include a first mounting surface connected to the first heater blanket assembly and a second mounting surface connected to the second heater blanket assembly. The heater blanket deployment system may be configured such that the first workpiece can be processed at the first workstation only when a second workpiece at the second workstation is not being processed.

In an embodiment, a base may be mechanically coupled to the first mounting surface and the second mounting surface, wherein the first mounting surface, the second mounting surface, and the base form a Y-shaped frame.

The frame may be an overhead frame having a plurality of winches configured to lower the first heater blanket assembly toward, and raise the first heater blanket assembly away from, the first working surface, and further configured to lower the second heater blanket assembly toward, and raise the second heater blanket assembly away from, the second working surface.

The heater blanket deployment system may further include a plurality of lifting straps attached to one of the first heater blanket assembly and the second heater blanket assembly, wherein the plurality of winches are configured to lower the first heater blanket assembly toward, and raise the first heater blanket assembly away from, the first working surface using the plurality of lifting straps, and further configured to lower the second heater blanket assembly toward, and raise the second heater blanket assembly away from, the second working surface using the plurality of lifting straps.

The first workstation may further include a first vacuum bag, and the first workstation may be configured such that the first vacuum bag overlies the first working surface during processing of the workpiece. The second workstation may include a second vacuum bag, and the second workstation may be configured such that the second vacuum bag overlies the second working surface during processing of the second workpiece. The frame may further include a base directly interposed between the first workstation and the second workstation. The heater blanket deployment system may further include a vacuum source in fluid communication with the first and second vacuum bags. The power supply and the vacuum supply may be positioned within the base of the frame.

The heater blanket deployment system may further include at least a first elongated seal configured to maintain a first vacuum between the first heater blanket assembly and the first working surface and at least a second elongated seal configured to maintain a second vacuum between the second heater blanket assembly and the second working surface.

The heater blanket deployment system may further include a first protective release layer that overlies the first smart susceptor heater blanket and the second smart susceptor heater blanket. A second protective release layer may overlie the third smart susceptor heater blanket and the fourth smart susceptor heater blanket. The first protective release layer may be positioned between the first smart susceptor heater blanket and the first working surface, and the second protective release layer may be interposed between the second smart susceptor heater blanket and the second working surface.

The first smart susceptor heater blanket may include a first wire assembly including a first susceptor wire wrapped around a first litz wire, and the second smart susceptor heater blanket may include a second wire assembly including second susceptor wire wrapped around a second litz wire. A first wire ribbon may include the first wire assembly. The first wire ribbon may have a first length from a first connector to a second connector. A second wire ribbon may include the second wire assembly, and the second wire ribbon have a second length from a third connector to a fourth connector. The first length may vary from the second length by no more than ±20%.

In another embodiment, a method for processing a first workpiece and a second workpiece may include placing a first workpiece onto a first working surface of a first workstation, moving a first heater blanket assembly having a first smart susceptor heater blanket, a second smart susceptor heater blanket, and a first vacuum bag from a first position away from the first workpiece to a second position proximate the first workpiece, and powering the first smart susceptor heater blanket and the second smart susceptor heater blanket to heat the first workpiece. The method may further include applying a first vacuum to the first vacuum bag to remove a gas from the first workpiece, placing a second workpiece onto a second working surface of a second workstation, and moving a second heater blanket assembly having a third smart susceptor heater blanket, a fourth smart susceptor heater blanket, and a second vacuum bag from a third position away from the second workpiece to a fourth position proximate the second workpiece. Additionally, the method may include powering the third smart susceptor heater blanket and the fourth smart susceptor heater blanket to heat the second workpiece and applying a second vacuum to the second vacuum bag to remove a gas from the second workpiece. The first workstation may be positioned adjacent to the second workstation, and the powering of the first smart susceptor heater blanket, the second smart susceptor heater blanket, the third smart susceptor heater blanket, and the fourth smart susceptor heater blanket may be performed using a power source supported by a frame. The applying of the vacuum to the first vacuum bag and the second vacuum bag may be performed using a vacuum source supported by the frame.

The method may further include moving a first mounting surface of the frame that is attached to the first heater blanket assembly during the moving of the first heater blanket assembly, and moving a second mounting surface of the frame that is attached to the second heater blanket assembly during the moving of the second heater blanket assembly. The frame may be configured such that the first mounting surface of the frame and the first heater blanket assembly can be moved from the first position to the second position only when moving the second mounting surface and the second heater blanket assembly from the fourth position to the third position. In an embodiment, during the applying of the vacuum to the first vacuum bag, the vacuum cannot be applied to the second vacuum bag. In another embodiment, the frame may be configured such that the first mounting surface of the frame and the first heater blanket assembly can be moved from the first position to the second position independently of the movement of the second mounting surface and the second heater blanket assembly. The first workpiece may include a plurality of first uncured composite plies, the second workpiece may include a plurality of second uncured composite plies, and the method may further include debulking the first workpiece during the applying of the vacuum to the first vacuum bag and debulking the second workpiece during the applying of the vacuum to the second vacuum bag.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

Figure 1:
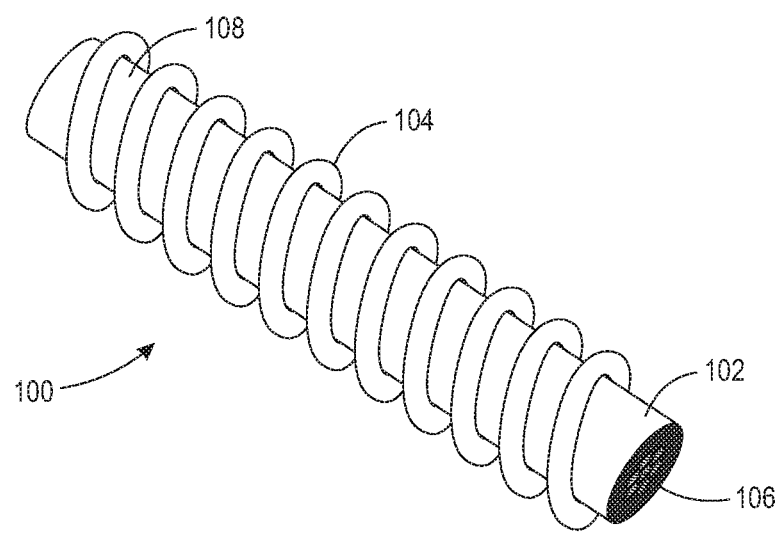
FIG. 1 is a perspective depiction of a wire assembly including a litz wire and a susceptor wire in accordance with an embodiment of the present teachings.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

A smart susceptor heater blanket (hereinafter, "heater blanket") for out-of-autoclave (OOA) curing of a composite patch is described, for example, in U.S. Pat. No. 9,174,398 which is commonly assigned herewith and incorporated herein by reference in its entirety. The heater blanket of the incorporated patent may be used to cure a patch over a relatively small rework area.

An embodiment of the present teachings may provide a method and apparatus for processing large components OOA, for example, debulking of an uncured composite part. The method and apparatus may allow OOA debulking of a large-scale composite part, for example, a plurality of uncured composite plies having a size (e.g., a perimeter, footprint, or outside dimension) that previously required debulking or other processing within an autoclave due to size or other contributing factors. With prior processing, increasing the blanket size to accommodate large-scale composite parts presents several challenges. For example, a large heater blankets require long internal wiring with a high electrical resistance, and therefore require a high current power source to sufficiently power the blanket, which is expensive. Further, very large smart susceptor heater blankets are expensive to manufacture, and the cost of scrapping an unrepairable smart susceptor heater blanket is also expensive. Therefore, large components have most often been both debulked and cured within an autoclave. However, autoclave processing is also expensive as a large volume of process gas such as nitrogen must be heated, cooled, and reheated during debulking of a large-scale composite part within an autoclave. There is also substantial capital cost and manufacturing flow time associated with the use of an autoclave.

An embodiment of the present teachings may include processing apparatus including a plurality of interconnected heater blankets. While the present teachings are generally described with reference to a debulking process for simplicity, it will be understood that other processing, such as curing, is also contemplated.

The debulking apparatus may include a particular electrical design that requires a relatively low current power source and has a low electrical interference between adjacent heater blankets. In an embodiment, the debulking apparatus may include at least two (i.e., two or more) heater blankets, for example, 8, 12, 16, 20, or more interconnected heater blankets, with the number of interconnected heater blankets depending, for example, on the size of the heater blankets and the size of the composite part that is being debulked. A modular heater blanket design in accordance with an embodiment of the present teachings may facilitate simplified replacement and powering of apparatus components at a reduced cost compared to single heater blanket designs.

It will be appreciated that actual assemblies represented by the FIGS. may include other structures that have not been depicted for simplicity, and that depicted structures may be removed or modified.

FIG. 1 is a perspective depiction of a portion of a heater blanket wire assembly 100 that includes a litz wire 102 and a susceptor wire 104 that may wrap around the litz wire 102 in a helix or spiral to form a plurality of susceptor windings around the litz wire. As known in the art, the litz wire 102 includes a plurality of electrically conductive wires 106 electrically insulated from each other, and an electrical insulator 108 interposed between the susceptor wire 104 and the plurality of conductive wires 106. In an embodiment, the wire assembly 100 may have a diameter of from about 0.04" to about 0.08", or about 0.06", as measured on an outside surface of the susceptor wire 104, although other dimensions are contemplated. The wire assembly 100 includes a first end and a second end opposite the first end, wherein the wire assembly 100 extends from the first end to the second end. The length of the wire assembly 100 will depend on the size of the heater blanket that it forms a part of but, in an embodiment, the wire assembly 100 may be from about 5 feet to about 100 feet long.

Figure 2:
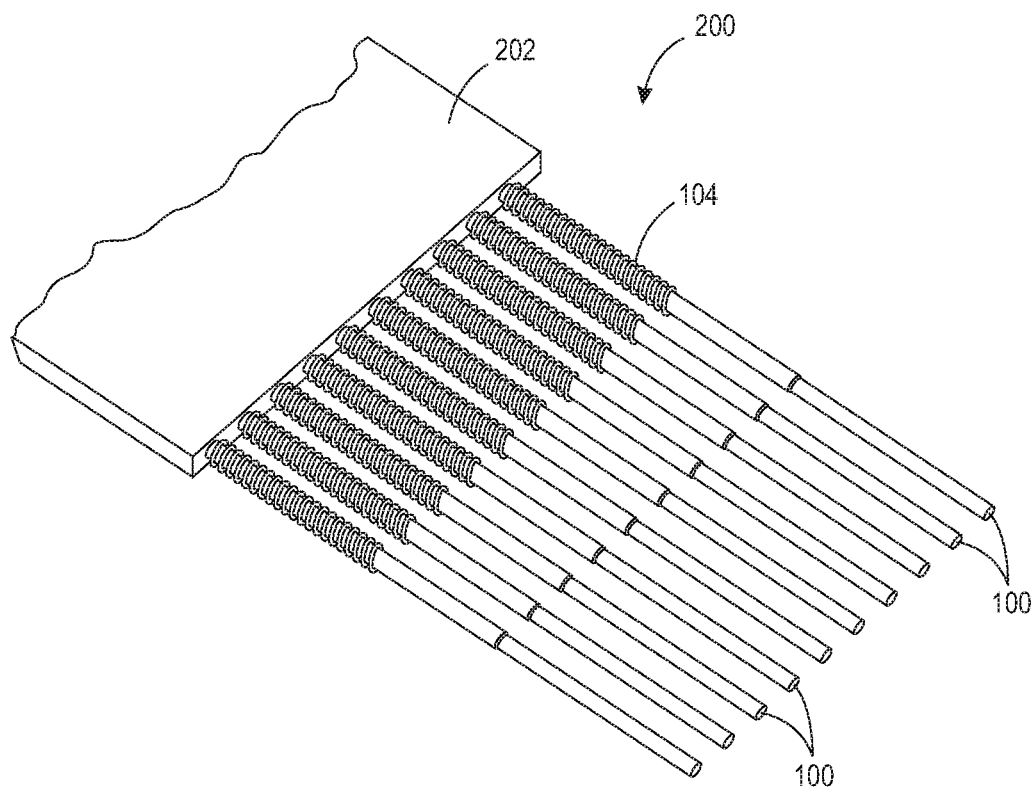
FIG. 2 is a perspective depiction of a wire ribbon including a plurality of wire assemblies in accordance with an embodiment of the present teachings.

FIG. 2 is a cutaway perspective depiction of a portion of a wire ribbon 200 that includes a plurality of individual spaced wire assemblies 100. The plurality of wire assemblies 100 may be encapsulated or otherwise encased within an electrically insulative and thermally conductive binder 202 such as a silicone binder. In an embodiment, the binder 202 may have a thickness of from about 0.025" to about 0.25", or another thickness that is suitable for transfer of thermal energy generated within the susceptor wires by the flow of current through the litz wires to an adjacent workpiece. The wire ribbon 200 may include any number of wire assemblies 100, for example, at least two, or up to 10 or more wire assemblies 100. The wire ribbon 200 may have a width of from about 0.5" to about 12", or from about 0.5" to about 12", or from about 2" to about 12", or from about 0.5" to about 6.0", or another suitable width depending, for example, on size constraints, electrical constraints, the number of wire assemblies 100 within the wire ribbon 200, etc.

Figure 3:
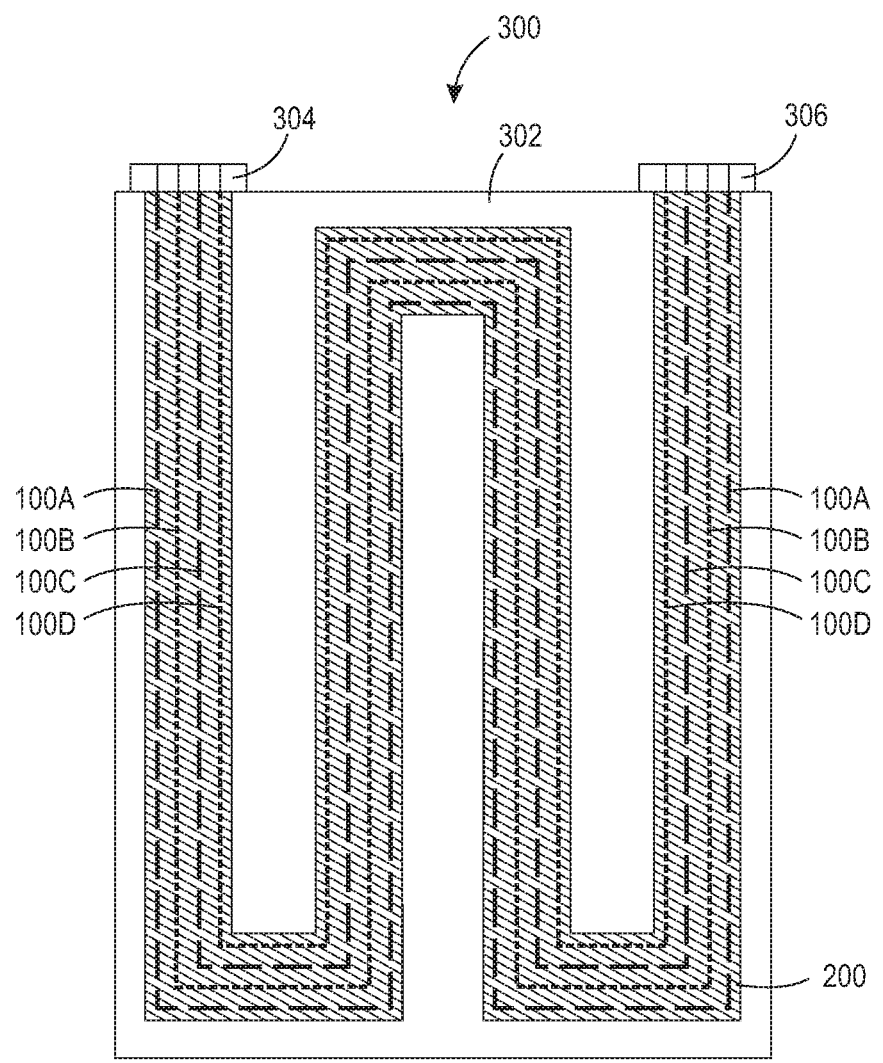
FIG. 3 is a plan view of a smart susceptor heater blanket in accordance with an embodiment of the present teachings.

FIG. 3 is a plan view depicting a heater blanket 300 including the wire ribbon 200 of FIG. 2. For illustration, the wire ribbon 200 of FIG. 3 includes four wire assemblies 100A-100D. The heater blanket 300 may include a blanket substrate 302. In an embodiment, the blanket substrate 302 may include a layer of silicone binder to which the wire ribbon is attached using an attachment such as an adhesive. In another embodiment, the blanket substrate 302 may include two layers of silicone binder, wherein the wire ribbon 200 is interposed between the two layers. In any case, the wire ribbon is positioned to extend back and forth (i.e., serpentine) across the heater blanket as depicted in FIG. 3. While the wire ribbon 200 in FIG. 3 is depicted with three 180° turns for simplicity given the scale of the figure, it will be appreciated that a wire ribbon 200 may include, for example, between six and twelve 180° turns, or eight or more 180° turns as it serpentines across the heater blanket 300. Further, the wire ribbon 200 may be formed as a straight ribbon and folded in a desired pattern to form the heater blanket 300, and may extend across the heater blanket 300 in other patterns. In general, the wire ribbon 200 may cover a suitable percentage of the heater blanket surface area, perimeter, or footprint to maintain even heating of the article being debulked during the debulking process.

The heater blanket 300 further includes a first electrical connector 304 attached to the first end of each wire assembly 100 and a second electrical connector 306 attached to the second end of each wire assembly. In an embodiment, the first electrical connector 304 may be a male type connector and the second electrical connector may be a female type connector. The pair of connectors 304, 306 allows a power source to be electrically coupled to each of the wire assemblies 100A-100D using either a series connection or a parallel connection as described below. Two or more heater blankets 300 may be manufactured.

Figure 4:
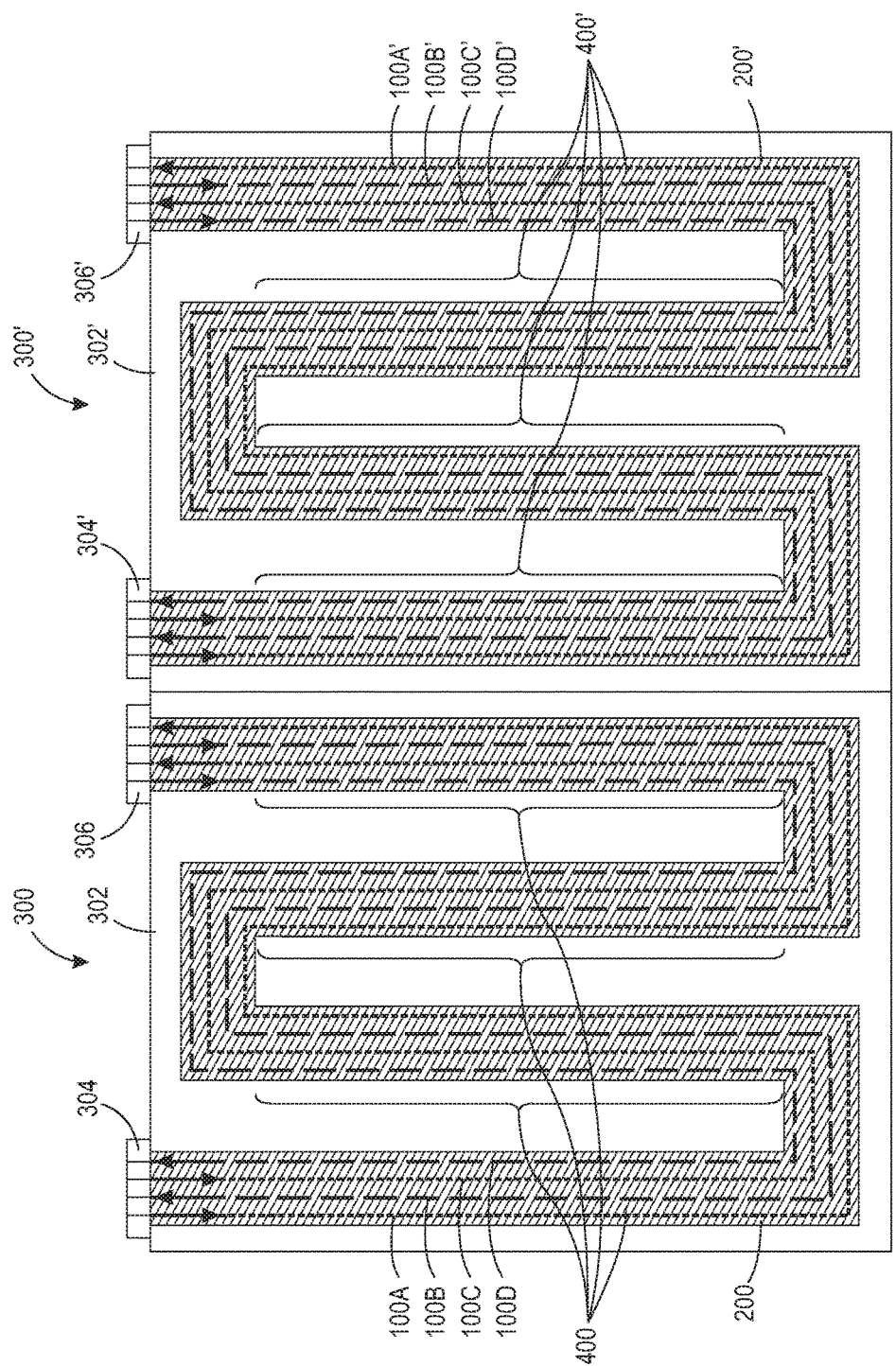
FIG. 4 is a plan view depicting two or more adjacent smart susceptor heater blankets in accordance with an embodiment of the present teachings.

Two or more heater blankets 300 of FIG. 3 may be assembled to form a component of the debulking apparatus as depicted in FIG. 4, which depicts a first heater blanket 300 and a second heater blanket 300 prime (300'), which may be identical or may vary in shape. However, in general, the length of the wire ribbon 200 within each heater blanket may be similar such that both or all heater blankets are matched with respect to power requirements. In an embodiment, the wire ribbon 200 within each heater blanket 300 may be manufactured such that the length of all wire ribbons varies by no more than about ±10% from a target length. In other words, the shortest wire ribbon may have a length no more than 0.9 times the target length of all wire ribbons for the debulking apparatus, and the longest wire ribbon may have a length no more than 1.1 times the target length. This ensures that all heater blankets within the debulking apparatus operate with similar heating and cooling characteristics so that a uniform and predictable temperature may be maintained across the article being debulked. In other embodiments, the wire ribbon 200 within each heater blanket 300 may be manufactured such that the length of all wire ribbons varies by no more than ±20%, or by no more than ±15%. In other embodiments, the variation in length may not a design consideration.

Figure 5:
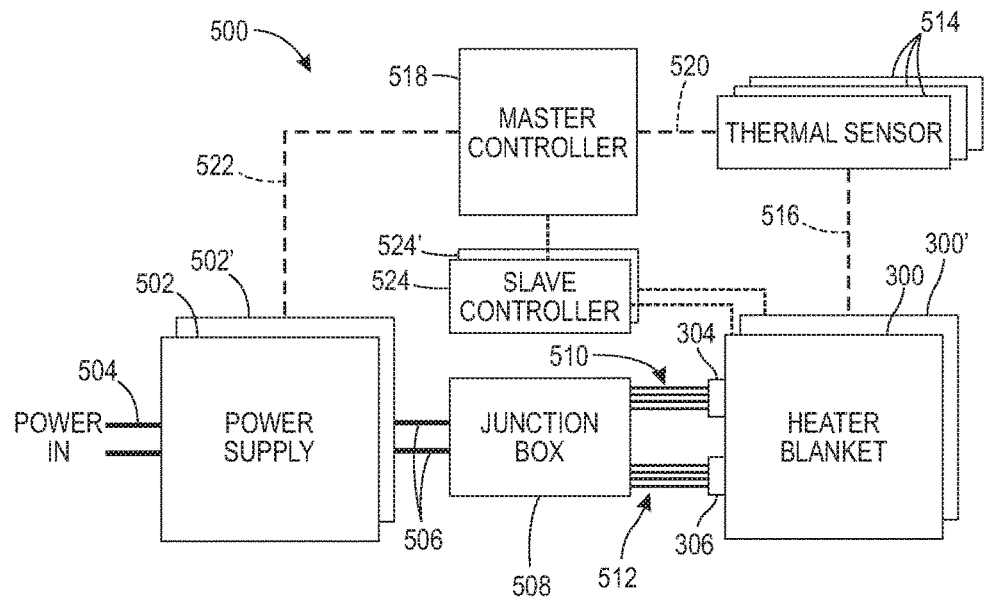
FIG. 5 is a schematic depiction of a processing assembly such as a debulking apparatus in accordance with an embodiment of the present teachings.

FIG. 5 is a block diagram of a heater blanket apparatus 500 that may be part of a debulking apparatus. While the FIG. 5 depiction includes two heater blankets 300, 300' for debulking an uncured composite part in accordance with an embodiment of the present teachings, it will be understood that a heater blanket apparatus 500 may include any number of heater blankets. FIG. 5 depicts one or more power supplies 502, 502' including an input 504 and an output 506. As described below, one power supply 502 may power all heater blankets 300, 300', or separate power supplies 502, 502' may power each heater blanket 300, 300'. FIG. 5 further depicts a junction box 508 having an input (e.g., the output 506 of the power supply 502). The junction box provides a first input/output 510 to each of the first connectors 304, and a second input/output to each of the second connectors 306. The input/outputs 510, 512 from the junction box 508 will depend on the particular design or configuration of the heater blanket apparatus 500 as described below. The heater blankets 300, 300' are electrically coupled with, and receive power through, input/outputs 510, 512 of the junction box 508 through the electrical connectors 304, 306 as depicted.

FIG. 5 further depicts a plurality of thermal sensors 514 such as thermocouples. The thermal sensors 514 are in thermal communication 516 with one or more of the heater blankets 300, 300'. In an embodiment, a plurality of the thermal sensors are in thermal proximity to each of the heater blankets 300, 300' to monitor a temperature of the heater blankets 300, 300', and assist in maintaining a uniform heater blanket temperature range during debulking. The thermal sensors 514 may transfer temperature data to a controller 518, for example, through a wired or wireless connection or interface 520. The controller 518 is in electrical communication with, and controls, the power supply through, for example, a communication cable 522.

The master controller 518 may be electrically coupled with, and control, a plurality of slave controllers 524, 524'. Each slave controller 524, 524' is electrically coupled with one of the heater blankets 300, 300' respectively. Each slave controller 524, 524' monitors and controls one of the heater blankets 300, 300'. Further, each slave controller 524, 524' may receive data and instructions from the master controller 518, and may pass operational data relative to the heater blankets 300, 300' to the master controller 518. The master controller 518 may control the output 506 from the power supplies 502, 502' based on the heater blanket operational data.

During use, each litz wire 102 of each wire ribbon 200 is electrically coupled with the power supply 502. Current from the power supply 502 flowing through the litz wire 102 generates a magnetic field within each susceptor wire 104 of each wire ribbon 200 of each heater blanket 300. The magnetic field, in turn, generates heat within the wire ribbon 200 which thereby heats each heater blanket 300. The susceptor wire includes a Curie temperature ($T_c$), where the Curie temperature results, at least in part, from the particular composition of the susceptor wire. Inductive heating of the susceptor wire may be reduced when the susceptor sleeve becomes non-magnetic upon reaching the Curie temperature. The reduction in the heating of the susceptor sleeve may result in reducing the conductive heating of the structure. At a low temperature, a magnetic permeability of the susceptor wire 104 is high, and thus a skin depth of the susceptor wire 104 is small and the magnetic field induces strong eddy currents having a relatively high thermal output that heats the heater blanket 300. As the temperature of the susceptor wire 104 increases, the magnetic permeability of the susceptor wire 104 decreases to a lower value and the skin depth of the susceptor wire 104 increases. At high temperatures, the skin depth is larger than the radius of the susceptor wire 104, and the eddy currents within the susceptor wire 104 interfere with each other thereby weakening the eddy currents. The weaker eddy currents have a relatively low thermal output and thus the heater blanket 300 generates less heat. Each portion of the susceptor wire 104 thereby becomes its own temperature regulator to maintain a uniform temperature without altering the current applied to the litz wire 102. The temperature self-regulation occurs locally and continuously along the length of each wire ribbon 200, such that the desired temperature within a temperature range is maintained at all locations along the length of the wire ribbon 200 and, therefore, across the area of the heater blanket 300. Unless otherwise noted, as used herein, the terms "smart susceptor heater blanket," "susceptor heater blanket," and "heater blanket" refer to a heater blanket that is capable of temperature self-regulation.

As depicted in FIG. 4, at least two heater blankets 300, 300' are placed adjacent to each other during a debulking operation, for example, to increase the area that may be simultaneously debulked. The two or more heater blankets 300, 300' may be electrically coupled together, either in series or in parallel, and to the power supply 502 as described below.

The arrows positioned near each connector 304, 306 on each wire assembly 100 of FIG. 4 represent a direction of AC current flow at a given point in time that provides a current polarity for each wire assembly 100 and, more particularly, through each litz wire 102 of each wire assembly 100. The current is applied to each litz wire 102 such that the current flows in a direction that is opposite to the direction of current flow through every adjacent litz wire 102. In other words, during use, the current in each wire segment is 180° out of phase with each adjacent wire segment. As depicted in FIG. 4, current flows away from the first connector 304 and toward the second connector 306 for wire assemblies 100A and 100C, and current flows toward the first connector 304 and away from the second connector 306 for wire assemblies 1008 and 100D. In other words, current flows in a first direction for wire assemblies 100A and 100C (generally depicted as relatively longer dashed lines) and in a second direction for their respective adjacent wire assemblies 1008 and 100D (generally depicted as relatively shorter dashed lines), wherein the second direction is opposite to the first direction.

Additionally, as depicted in FIG. 4, for purposes of description, each wire ribbon 200, 200' may include a plurality of parallel major segments or legs 400, 400' that are positioned adjacent to at least one other major segment 400, 400'. As depicted, the rightmost major segment 400 for heater blanket 300 is positioned adjacent to, and is parallel with, the leftmost major segment 400' for heater blanket 300', such that wire assembly 100A is positioned adjacent to wire assembly 100A'. As depicted, the flow of current through wire assembly 100A in the rightmost major segment 400 is opposite to the flow of current through wire assembly 100A' in the leftmost major segment 400'. It will be realized, however, that this occurs particularly when both blankets are connected to the same power supply. In general, two or more power supplies will operate at somewhat different frequencies and so, in this example, current in the rightmost major segment 400 will be in the opposite direction only about half the time. This will lead to at least a small increase in magnetic fields.

Maintaining the flow of current in opposite directions for all adjacent wire assemblies 100A-100D, 100A'-100D' ensures that any magnetic field not absorbed by the susceptor windings is minimized by cancellation of an opposing field generated by the two adjacent major segments 400. This specific design element of the individual smart susceptor heater blankets 300, at least in part, enables the ability to place two or more heater blankets 300 directly adjacent to one another without causing or resulting in electromagnetic or thermal interference which would affect the heating of the heater blanket 300, the debulking apparatus in general, and any item being heated thereby.

Figure 6:
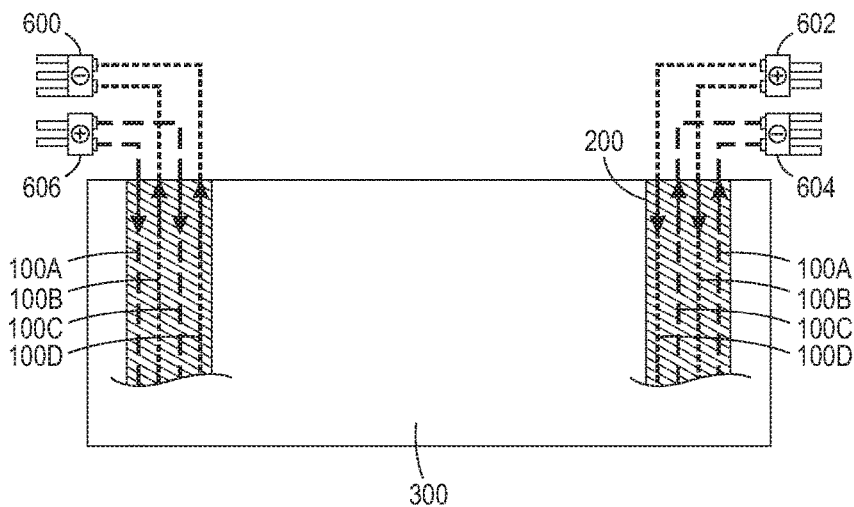
FIG. 6 is a schematic plan view depicting a portion of a smart susceptor heater blanket in accordance with an embodiment of the present teachings.

Various connection configurations for electrically coupling each heater blanket with the power supply and/or the junction box are contemplated. In one embodiment as depicted in FIG. 6, a pair of connector types may be used at each end of the wire ribbon 200. In this embodiment, the litz wires having the same polarity (e.g., the same current flow direction) are grouped into the same connector to enable proper electrical connection to adjacent blankets or electrical coupling to the power supply. In FIG. 6, connector 600 is a female connector having a negative polarity (i.e., current flow toward the connector) that is connected to a first end of wire assemblies 1008 and 100D, connector 602 is a male connector having a positive polarity (i.e., current flow away from the connector) that is connected to a second end of wire assemblies 1008 and 100D, connector 604 is a female connector having a negative polarity that is connected to a first end of wire assemblies 100A and 100C, and connector 606 is a male connector having a positive polarity that is connected to a second end of wire assemblies 100A and 100C.

Figure 7:
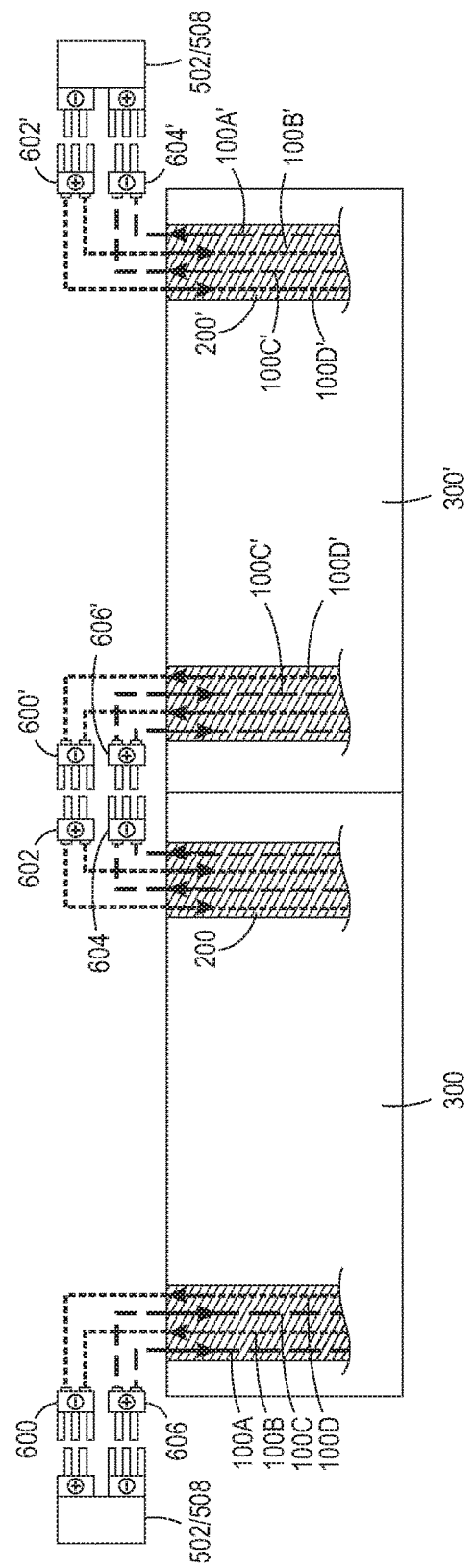
FIG. 7 is a schematic plan view depicting two or more smart susceptor heater blankets to be connected in series in accordance with an embodiment of the present teachings.

FIG. 7 depicts the heater blanket 300 (e.g., a first heater blanket) of FIG. 6 as it may be electrically coupled with a second heater blanket 300' using a series electrical connection (i.e., in series). Connectors 600, 606 of the first heater blanket 300 and connectors 602', 604' of the second heater blanket 300' are electrically connected or coupled with the power supply 502 and/or junction box 508, for example through electrical connectors as depicted. Connectors 602, 604 of the first heater blanket 300 are electrically connected to connectors 600', 606' of the second heater blanket 300' as depicted.

Figure 8:
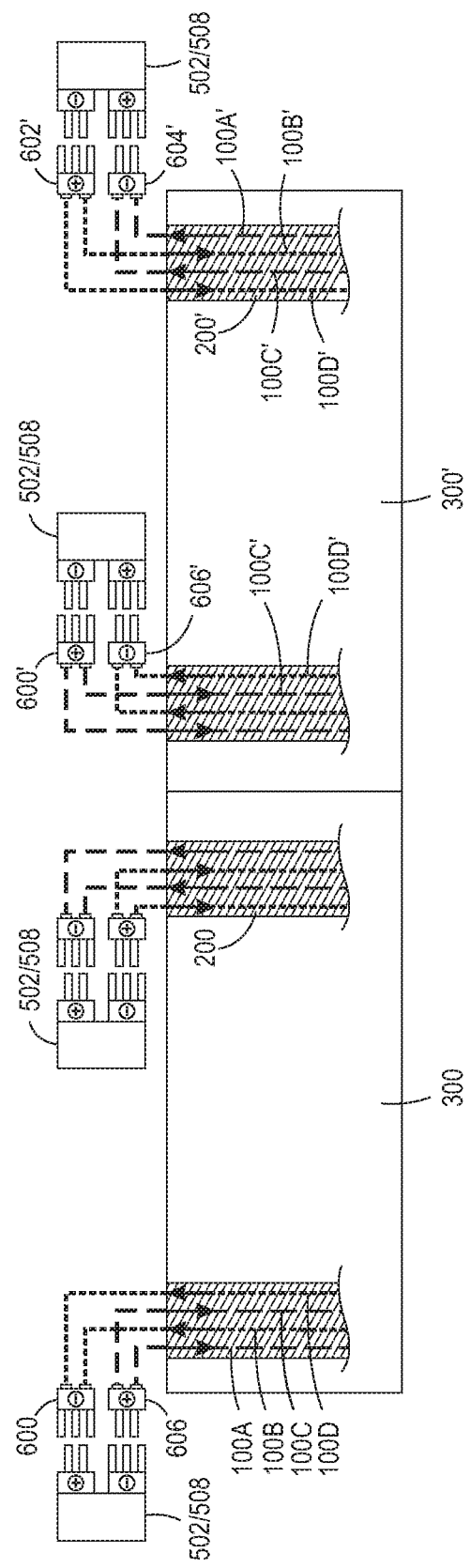
FIG. 8 is a schematic plan view depicting two or more smart susceptor heater blankets to be connected in parallel in accordance with an embodiment of the present teachings.

FIG. 8 depicts the first heater blanket 300 as it may be electrically coupled with the second heater blanket 300' using a parallel electrical connection (i.e., in parallel). Each of the electrical connectors 600-606, 600'-606' are electrically connected or coupled with the power supply 502 and/or junction box 508, for example through electrical connectors as depicted. In an embodiment, each power supply 502 of FIG. 8 is the same power supply 502. In another embodiment, each power supply 502 of FIG. 8 is a different power supply 502, for example, to reduce the current requirements for each power supply.

Figure 9:
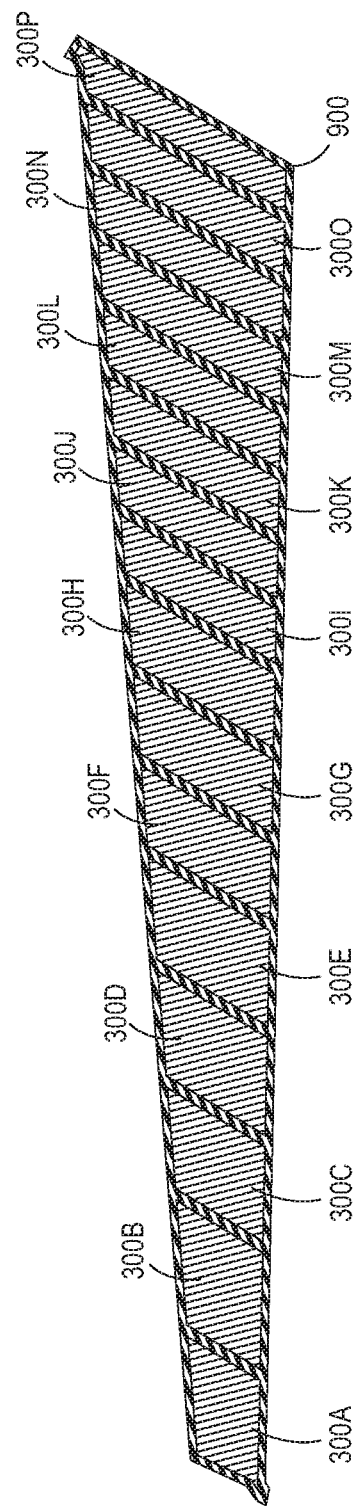
FIG. 9 is a plan view depicting a plurality of smart susceptor heater blankets and an uncured composite part to be debulked in accordance with an embodiment of the present teachings.
Figure 10:
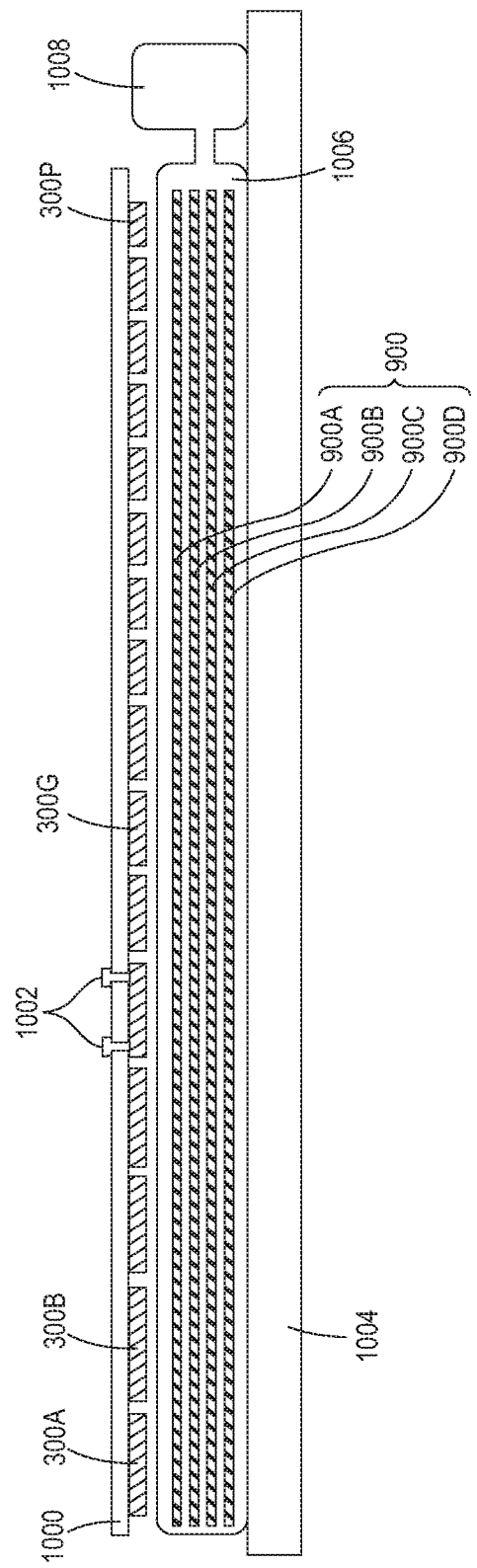
FIG. 10 is a cross section depicting a plurality of smart susceptor heater blankets and an uncured composite part to be debulked in accordance with an embodiment of the present teachings.

FIG. 9 is a plan view, and FIG. 10 is a cross section, of a debulking assembly including a plurality of heater blankets 300A-300P during use, and an uncured composite part or article 900 to be debulked. In this embodiment, 16 heater blankets (e.g., corresponding to 16 heating zones) 300A-300P are placed adjacent to each other and electrically coupled to a power supply, for example, as described above or using another connection design. In an embodiment, each heater blanket 300A-300P may be attached to a different power supply as described above, for example, to reduce current requirements. While FIG. 10 depicts the heater blankets 300A-300P overlying the composite part 900, the composite part 900 may be placed over the heater blankets 300A-300P. It will be realized that heater blankets may also be placed both over and under the composite part 900 during debulking. Further, while the composite part 900 of FIG. 10 depicts four laminate layers 900A-900D such as prepregs, it will be appreciated that the composite part 900 may include any number of laminate layers to be laminated together, for example, 40 or more layers. Further, composite part 900 may include a three dimensional (3D) woven prepreg rather than a laminate.

In FIG. 9, the plurality of heater blankets 300A-300P include individualized shapes that are designed to conform to the shape of the composite part 900 being debulked. Each heater blanket of the plurality of heater blankets 300A-300P may have the same, or different, perimeter lengths and shapes as all other heater blankets 300A-300P. Some heater blankets of the plurality of heater blankets 300A-300P may have the same perimeter lengths and shapes as other heater blankets 300A-300P, while other heater blankets have different perimeter shapes and lengths as other heater blankets 300A-300P. In an embodiment, each heater blanket 300A-300P may have a wire ribbon 200 as described above. In an embodiment including only a single power supply that powers every heater blanket 300A-300P, each wire ribbon for each heater blanket 300A-300P may be designed to have a length that varies no more than ±20%, or no more than ±15%, or no more than ±10% from a common target value, such that the power requirements for each heater blanket 300A-300P are matched and similar to all other heater blankets 300A-300P. The plurality of heater blankets 300A-300P may be mechanically attached to a mounting surface or support 1000 using, for example, a plurality of fasteners 1002 (depicted only on heater blanket 300E in FIG. 10 for simplicity). The fasteners 1002 may maintain the each blanket in a fixed position relative to one or more adjacent blankets. The composite part 900 may rest on a base or working surface 1004, such as a contoured layup mandrel, during debulking. In an embodiment where each heater blanket 300A-300P is powered by a separate power supply, the output of all power supplies may be the same, or the output may be matched for the requirement of the heater blanket that it powers.

In an embodiment, the composite part 900 may be placed into a vacuum bag 1006 that is attached to a vacuum source 1008 during debulking. During a debulking operation, electrical power is applied to each of the heater blankets 300A-300P while a vacuum is applied to the vacuum bag 1006 by the vacuum source 1008. The heater blankets 300A-300P may be designed to reach and maintain a target temperature such that the requirements for debulking the composite part 900 are met, and thus heat the composite part 900 to a desired temperature. The smart susceptor effect provides localized temperature control to account for variations in thermal load.

In an embodiment, each of the 16 heater blankets may be controlled through the use of 16 slave controllers 524 (FIG. 5), wherein each slave controller 524 controls and monitors one of the heater blankets 300A-300P. In an embodiment, the master controller 518 (FIG. 5) may define a ramp of temperature of each heater blanket 300A-300P, either directly or through the slave controllers 524, until each heater blanket 300A-300P reaches a temperature target or set point. The 16 slave controllers power the 16 heater blankets via feedback control loop based on temperature values within each zone measured, for example, using thermal sensors 514. Software within the controller 518 may include a software algorithm that surveys multiple temperatures in each zone. The highest temperature from a plurality of measurement points may be used for control at every point in time. The highest temperature during the temperature ramp may change from location to location within a zone over the duration of the temperature ramp and/or temperature dwell.

Each of the one or more power supplies may include load tuning that may be used to monitor a health of each smart susceptor heater blanket 300A-300P. The master controller 518 and/or slave controllers 524 may monitor the health of each heater blanket 300A-300P, both prior to and during the debulking operation. The controller 518 may further monitor operation of the vacuum source 1008 and the vacuum within the vacuum bag 1006. Process data may be continuously captured and logged within a data file before, during, and after a debulking operation for real-time or subsequent analysis.

It will be appreciated that the plurality of heater blankets 300A-300P may be assembled into an enclosure or interposed between two or more rigid and/or flexible layers such that the plurality of modular heater blankets 300A-300P become subassemblies of a heater blanket assembly.

Figure 11:
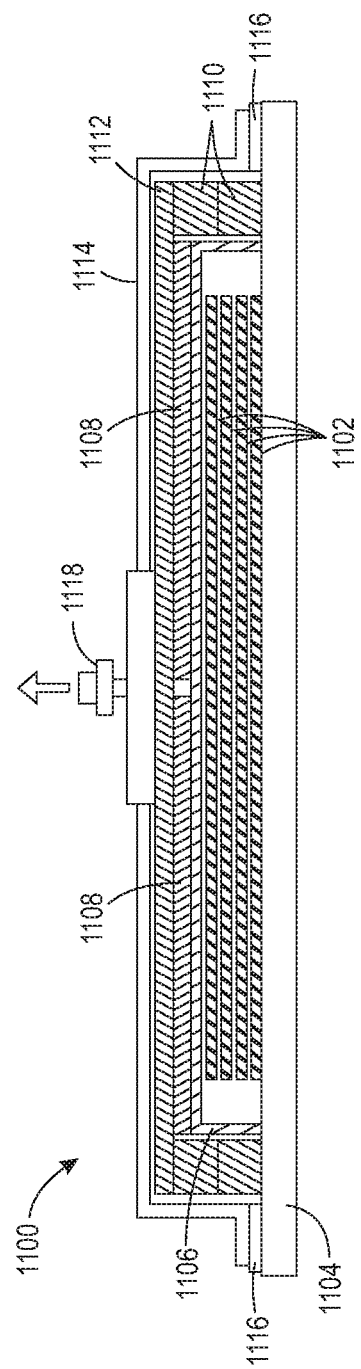
FIG. 11 is a cross section of a heater blanket assembly and composite layers to be processed within the heater blanket assembly.

Various embodiments for processing a composite part are contemplated. For example, FIG. 11 is a cross section of a heater blanket apparatus 1100 during an OOA process for debulking a plurality of layers 1102, although it will be understood that other processing, such as a curing process, etc., may be performed using the application of heat from a heater blanket apparatus 1100. While FIG. 11 depicts four layers 1102 such as four prepreg layers to be debulked, any number of layers 1102 such as 40 or more layers may be debulked. The layers 1102 may be stacked onto a layup mandrel 1104 such as an invar caul plate.

In addition to the layers 1102 to be debulked and the layup mandrel 1104, FIG. 11 depicts a protective release layer 1106, two or more heater blankets 1108, one or more breather layers 1110, 1112, and a vacuum bag 1114 sealed to the layup mandrel 1104 with a double-sided adhesive 1116. The protective release layer 1106 may be, for example, fluorinated ethyl propylene (FEP), ethylene tetrafluoroethylene (ETFE), or another suitable material. The vacuum bag 1114 may have an opening that receives a vacuum port 1118.

During debulking, a vacuum is applied to the layers 1102 by exhausting air, nitrogen, or another gas through the vacuum port 1118 using a vacuum source 1008 (FIG. 10). During the debulking, current is applied to each of the heater blankets 1108 to heat the heater blankets 1108 which, in turn, heats the layers 1102 during the debulking process. While the processing parameters may vary, in one process, the heater blankets may be ramped to a target temperature of 160° F.±10° F. During the temperature ramp, a temperature of the heater blankets 1108 is monitored using, for example, thermal sensors 514 (FIG. 5). During the temperature ramp, when a thermal sensor detects a temperature of, for example, 110° F., the master controller 518 may begin a process timer while the temperature increases to the 160° F. target, and during further processing. Once the process timer reaches a desired value, for example, three hours, the current may be removed from the heater blankets 1108 and the heater blanket apparatus 1100 may be allowed to cool. Process data logging may continue until a specified temperature is reached, for example, 110° F. Once a process termination temperature is measured by the thermal sensors, 514, the interior of the heater blanket apparatus 1100 may be vented, the vacuum bag 1114 may be removed, and the debulked layers 1102 may be moved to an autoclave or oven for final curing.

In this embodiment, two or more heater blankets 1108 are positioned within the vacuum bag 1114 during the debulk of layers 1102. The debulking of layers 1102 may thus be preformed out of an autoclave or oven. This embodiment thus provides a single-sided heating source (heater blankets 1108) that provides local heating directly to a large skin laminate (layers 1102) for debulk. The direct application of local heating may result in a laminate debulk that is comparable to results obtained by traditional debulk methods, with various advantages. For example, the process described above does not require heating of an entire volume of an oven or autoclave, thereby reducing processing time and energy costs. The heating is provided by an alternating current (AC) and/or direct current (DC) power supply, and thus no natural gas is required, thereby simplifying facility requirements. Additionally, because heating is localized, cooling of the assembly may be relatively rapid without the need for active cooling. Further, the entire tool and supporting structure is used to form the laminate to its desired shape, which reduces space requirements compared to an autoclave or oven. As described above, the smart susceptor heater blankets are self-regulating with regard to temperature. The wire assembly 100 continues to heat, thereby heating the smart susceptor heater blanket and the layers 1102, until the susceptor wire 104 reaches its Curie temperature ($T_c$) locally. Once the $T_c$ is reached, local heating ceases until the susceptor wire 104 cools to below the $T_c$ and heating begins again. Thus the heater blanket and the layers 1102 being heated by the heater blanket obtain a desired temperature without overheating.

Figure 12:
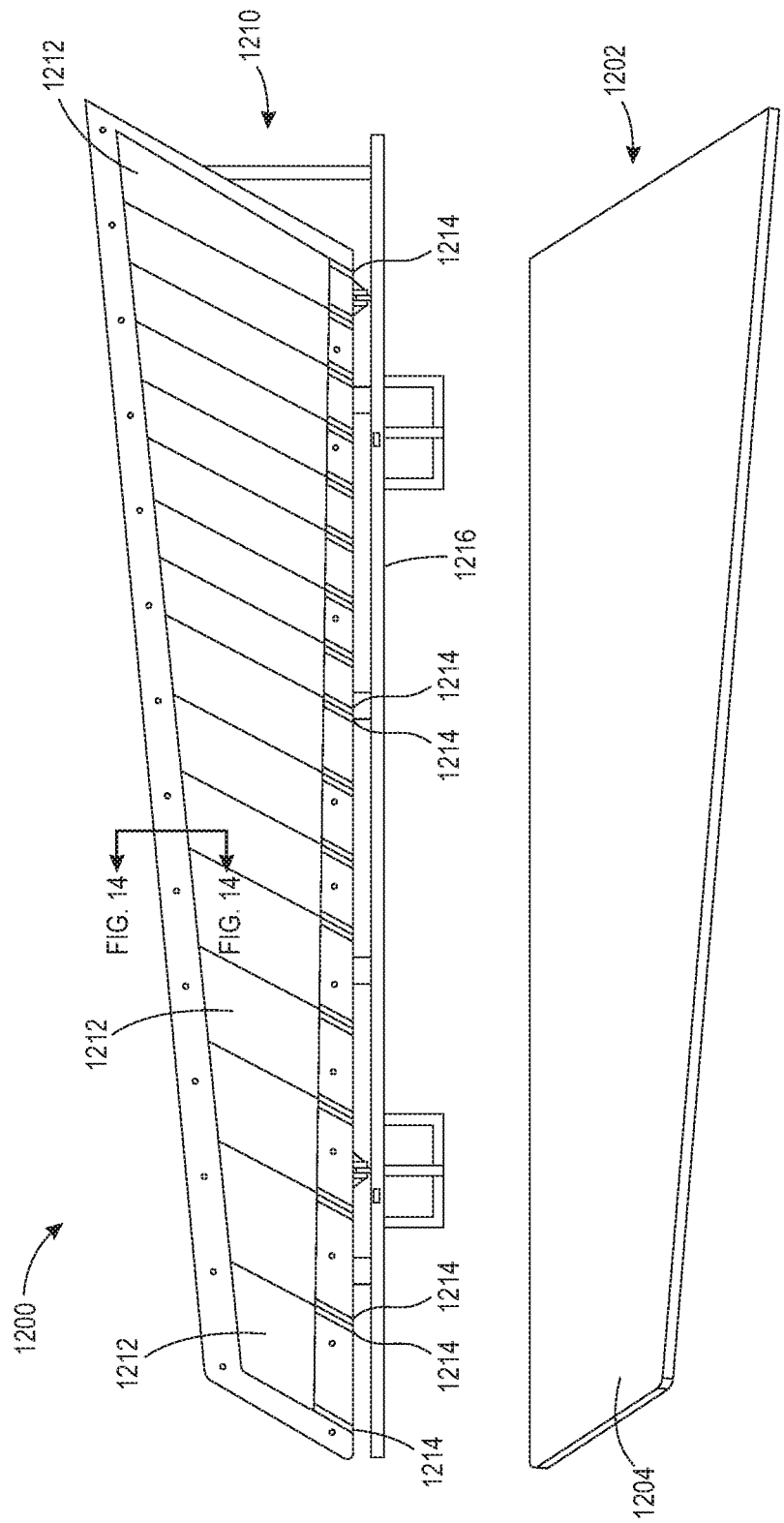
FIG. 12 is a schematic perspective depiction of a heater blanket apparatus including a plurality of heater blankets in accordance with an embodiment of the present teachings.

FIG. 12 is a schematic perspective depiction of another embodiment of a heater blanket apparatus 1200 that may be used, for example, for debulking a plurality of uncured plies of a composite laminate. In FIG. 12, a plurality of heater blankets are mounted to a frame or fixture to provide a heater blanket apparatus for heating a plurality of layers during processing such as a debulking operation. The FIG. 12 depiction includes a first subsection 1202 having a layup mandrel 1204 and a second subsection 1210 having 16 separate heater blankets 1212, although a heater blanket apparatus having two or more heater blankets 1212 is contemplated. Each heater blanket 1212 is electrically coupled with a power supply through one or more cables 1214 connected to the wire ribbon 200, for example, with a first connector 304. The plurality of heater blankets 1212 may be connected to the power supply either in parallel (as depicted in FIG. 12) or in series. Series and parallel connections are described above. During debulking, the second subsection 1210 may be lowered onto the first subsection 1202, wherein the laminate layers to be debulked are interposed between the first subsection 1202 and the second subsection 1210 and, more particularly, between the layup mandrel 1204 and the heater blankets 1212. The plurality of heater blankets 1212 may be supported by a frame 1216.

Figure 13:
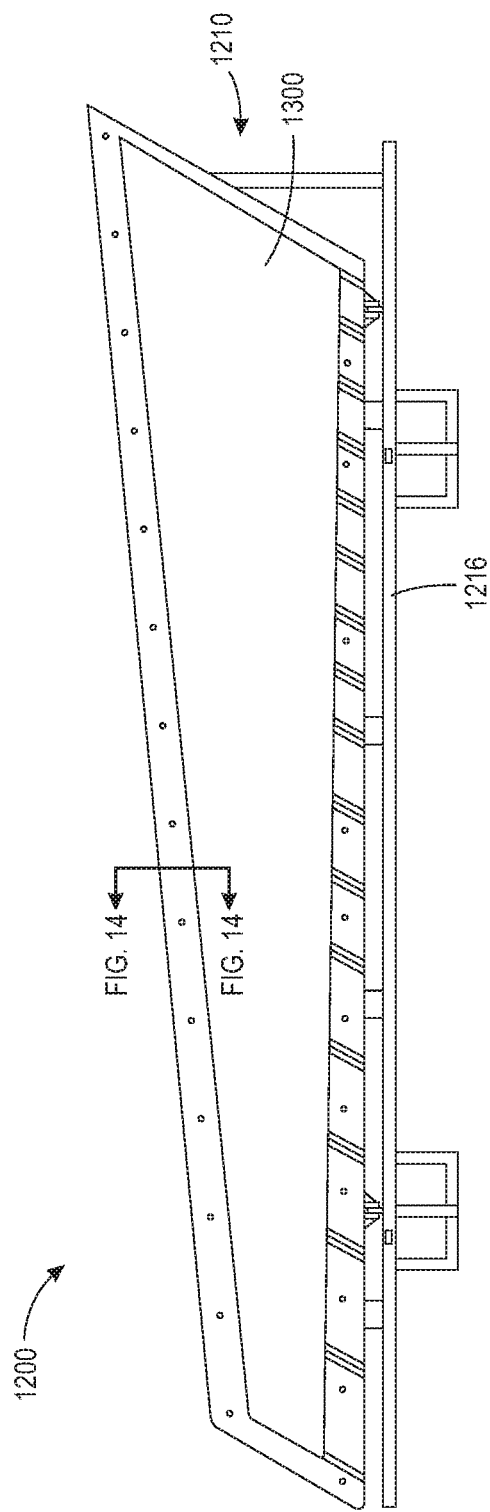
FIG. 13 depicts a portion of the FIG. 12 structure prior to attaching the plurality of heater blankets.

FIG. 13 depicts the second subsection 1210 prior to installation of the heater blankets 1212, and depicts a vacuum bag 1300 wherein, during debulking, the plurality of heater blankets 1212 are interposed between the vacuum bag 1300 and the layers to be debulked. The vacuum bag 1300, in part, allows a vacuum to be formed around the layers to be debulked.

Figure 14:
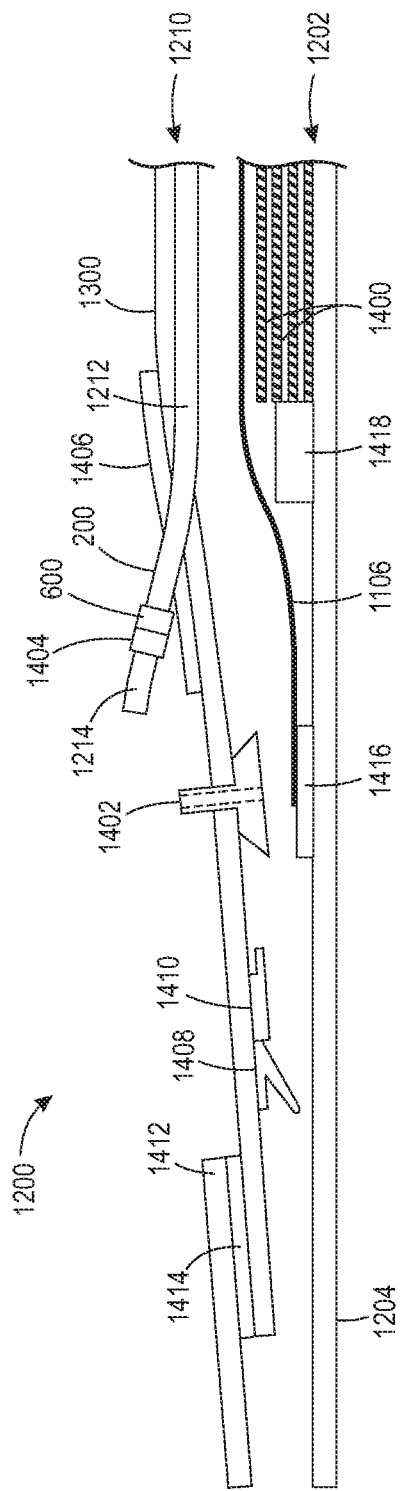
FIG. 14 is a cross section of a portion of the FIG. 12 structure.

FIG. 14 is a cross section depicting a portion of the first subsection 1202 and the second subsection 1210, with a plurality of uncured composite plies 1400 prior to debulking. FIG. 14 depicts a vacuum port 1402 that extends through the vacuum bag 1300. When in fluid communication with the vacuum source 1008 (FIG. 10), the vacuum port 1402 allows a vacuum to be applied to the composite plies 1400 during debulking by venting air, nitrogen, vapors, or another gas. FIG. 14 further depicts one of the plurality of cables 1214 electrically connected to one of the heater blankets 1212 using a first connector 600 and a second connector 1404. A reinforcement seal 1406 may be attached to an upper surface of the vacuum bag 1300 to prevent tearing around an opening through which the wire ribbon 200 extends, and to form a seal to prevent loss of the vacuum during debulking.

The second subsection 1210 may include other features as necessary to maintain a vacuum during processing. For example, FIG. 14 depicts an elongated seal 1408, such as an elongated T7™ seal or another reusable elongated seal, typically including silicone or another sufficient material, that physically contacts, and maintains a seal with, the layup mandrel 1204 during processing, and a spacer 1410 that spaces the vacuum bag 1300 from the layup mandrel 1204 to maintain the vacuum.

FIG. 14 further depicts one of a plurality of straps 1412 that attaches the second subsection 1210 to a portion of the frame 1216, for example, to an I-beam as described below. The plurality of straps 1412 may be manufactured from a material such as fiberglass-reinforced silicon. The plurality of straps 1412 may be attached to the second subsection 1210 and, more particularly, to the vacuum bag 1300, using silicone adhesive. A reinforcing layer 1414, for example fiberglass-reinforced silicone, may be interposed between the plurality of straps 1412 and the vacuum bag 1300 to reduce or prevent damage to the vacuum bag 1300 during use.

The heater blanket apparatus 1200 of FIG. 14 may include other structures, such as an edge breather 1416 that physically contacts the vacuum port 1402 and spaces the vacuum port 1402 from the layup mandrel 1204. The edge breather 1416 may be a porous layer that allows air and/or other gases to be evacuated away from the composite plies 1400 and through the vacuum port 1402 during the debulking of the composite plies 1400. The edge breather 1416 may be, for example, one or more layers of Airtech Airweave® N-10. FIG. 14 further depicts a protective release layer 1106 as described above, for example FEP, and an edge dam 1418 that may be used to align and position the plurality of composite plies 1400.

Figure 15:
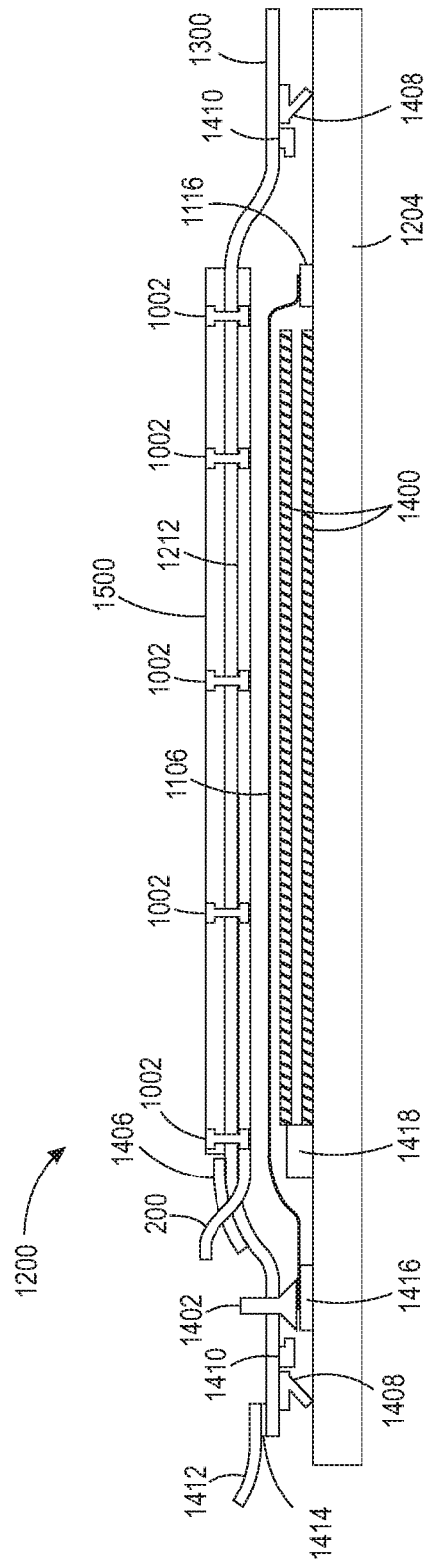
FIG. 15 is a cross section of the FIG. 12 structure during debulking or other processing.

FIG. 14 depicts detail of the FIG. 15 structure. FIG. 15 further depicts fasteners 1002 that may be used to physically and mechanically connect the plurality of heater blankets 1212 to the vacuum bag 1300 and to a mounting surface or support 1500. As depicted, the blanket apparatus 1200 may include additional elongated seals 1408 that physically contact, and maintain a seal with, the layup mandrel 1204 during processing, and spacers 1410 that space the vacuum bag 1300 from the layup mandrel 1204 to maintain the vacuum.

Figure 16:
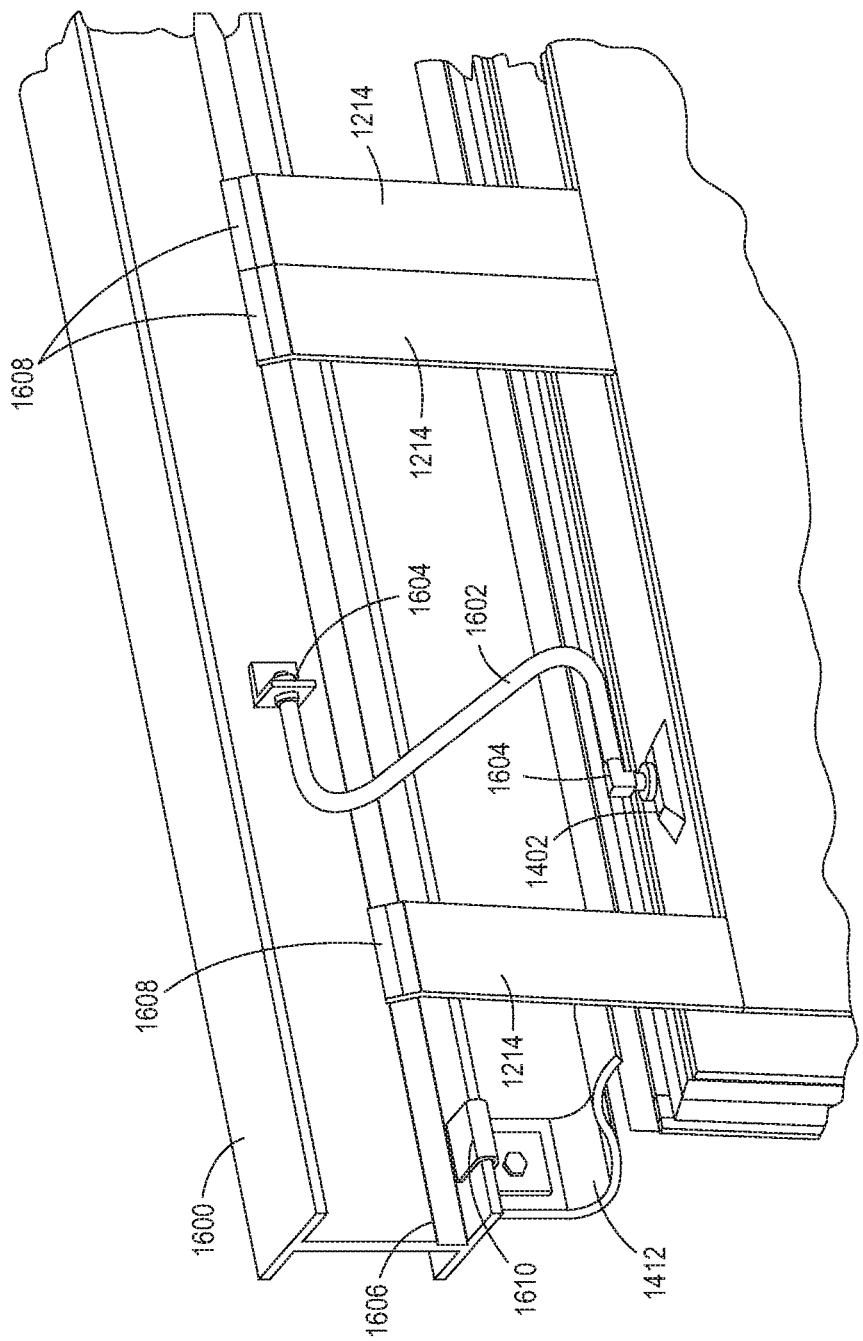
FIG. 16 is a perspective depiction of routing of power and vacuum to the FIG. 12 structure.

FIG. 16 depicts a support beam 1600 such as an I-beam or other rigid beam that may be part of the frame 1216 (FIG. 12). The support beam 1600 may be used as an attachment point for routing power, vacuum, etc., for connection to the second subsection 1210. FIG. 16 depicts a vacuum hose 1602 connected at a first end to the I-beam and at a second end to the vacuum port 1402. The vacuum hose 1602 may include fittings 1604 appropriate for connection to the vacuum port 1402 and the vacuum supply 1008 (FIG. 10). A power cable 1606 electrically coupled with one or more power supplies 502, for example, through a junction box 508 may be routed along the I-beam for electrical connection with the cables 1214 connected to the wire ribbon 200 of the heater blankets 1212. The power cable 1606 may include electrical connectors 1608 that facilitate electrical connection with the cables 1214. Each of the plurality of straps 1412 may be physically connected to the support beam 1600 using a bracket 1610. The straps 1412 are used to support the vacuum bag 1300 and other structures of the second subsection 1210 when in the resting/storage position.

During a debulking or other heating process, referring to FIG. 14, the plurality of layers 1400 to be debulked may be placed on the layup mandrel 1204. The second subsection 1210 may then lowered onto the first subsection 1202 such that the plurality of heater blankets 1212 are in physical proximity to, and in thermal communication with, the plurality of layers 1400. As depicted, the protective release layer 1106 may be interposed between the plurality of heater blankets 1212 and the plurality of layers 1400. It will be understood that the structure of FIG. 14 may include other features, structures, or layers that have not been depicted for simplicity, while depicted elements may be removed or modified.

Various embodiments for implementing the aforementioned heater blanket structures in, for example, a production environment are contemplated. It will be appreciated that while the description below describes structures and methods in terms of a production flow, uses in nonproduction environments are contemplated. Structural elements such as supporting frames and lift assists may be utilized to provide an efficient production flow having a sufficient output of product.

Figure 17:
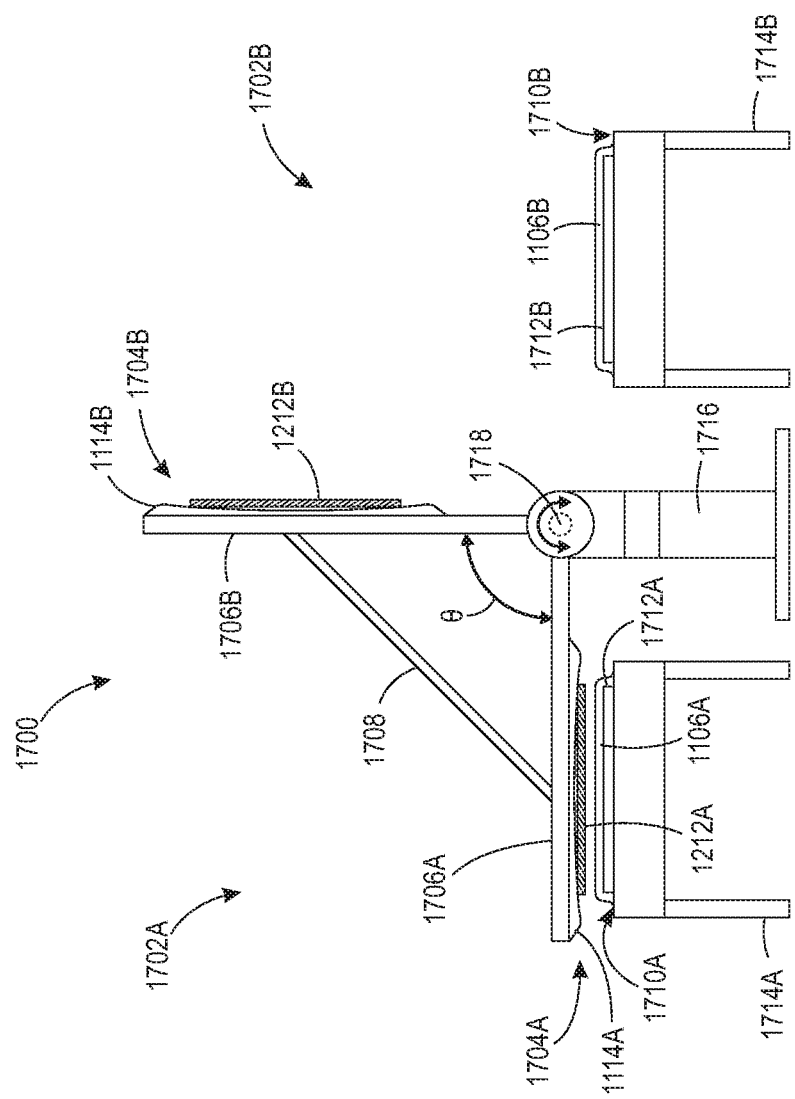
FIG. 17 is a side view of a heater blanket deployment system in a first position.

FIG. 17 depicts a heater blanket deployment system 1700 according to an embodiment of the present teachings. The deployment system 1700 of FIG. 17 includes a first workstation 1702A and a second workstation 1702B that may be similar to the first workstation 1702A. Inasmuch as the workstations 1702A, 1702B may include analogous structures, for simplicity of description, the FIG. 17 reference identifiers ending in "A" label elements of the first workstation 1702A while reference identifiers ending in "B" label elements of the second workstation 1702B.

Each workstation 1702 may include a heater blanket apparatus 1704, wherein each heater blanket apparatus 1704 may be similar to, or different from, the heater blanket apparatus 1200 of FIG. 15. Each workstation 1702 may thus include a smart susceptor heater blanket 1212 and a vacuum bag 1114 as described above, each of which may be mounted or attached to a mounting surface or support 1706. The two support surfaces 1706A, 1706B may be physically connected together using one or more struts or beams 1708 to maintain the support surfaces 1706 in a fixed position relative to each other. The one or more struts 1708 may be mechanically connected to each of the support surfaces 1706A, 1706B using any suitable fastener, such as bolts, welds, pins, etc.

Each workstation 1702 may further include a working surface 1710 such as a layup mandrel that may be contoured for a material or workpiece 1712 to be processed, such as a plurality of uncured composite plies to be debulked. Each working surface 1710 may be positioned by a support 1714 such as a table.

The deployment system 1700 may further include a base 1716 to which utilities such as power and vacuum are routed to, or positioned within. The base 1716 may be positioned or interposed between the first workstation 1702A and the second workstation 1702B as depicted in FIG. 17. The base 1716 may include a rod or bar 1718 to which each support surface 1706A, 1706B may be rotatably attached. In an embodiment, the rod 1718 may remain fixed and the support surfaces 1706 may rotate around the rod 1718. In another embodiment, the support surfaces 1706 may be fixedly mounted to the rod 1718, while the rod 1718 rotates within the base 1716. The first support surface 1706A, the second support surface 1706B, and the base 1716 thus may roughly form a Y-shaped frame interposed between the first working surface 1710A and the second working surface 1710B. In this configuration, a workpiece at one of the workstations is debulked or otherwise processed only when a workpiece at the other workstation is not being debulked or otherwise process.

During use, the first material to be processed 1712A may be positioned on the first working surface 1710A, and the first support surface 1706A may be rotated over the first material to be processed 1712A as depicted in FIG. 17. Power provided from one or more a power supplies 502 (FIG. 5) within the base 1716, or routed to the base 1716 from a remote power supply, may be applied to the first heater blanket 1212A, thereby heating the first heater blanket 1212A. Vacuum provided a vacuum supply 1008 (FIG. 10) within the base 1716, or routed to the base from a remote vacuum supply 1008), may be applied to the first vacuum bag 1114A, thereby removing air and/or other gases from between layers of the first material to be processed 1712A, for example, as described above.

During processing of the first material 1712A, the second material to be processed 1712B may be positioned on the second working surface 1710B in preparation for processing. Thus while one material is being processed at one working surface 1710, another material may be prepared for processing at the other working surface 1710.

Figure 18:
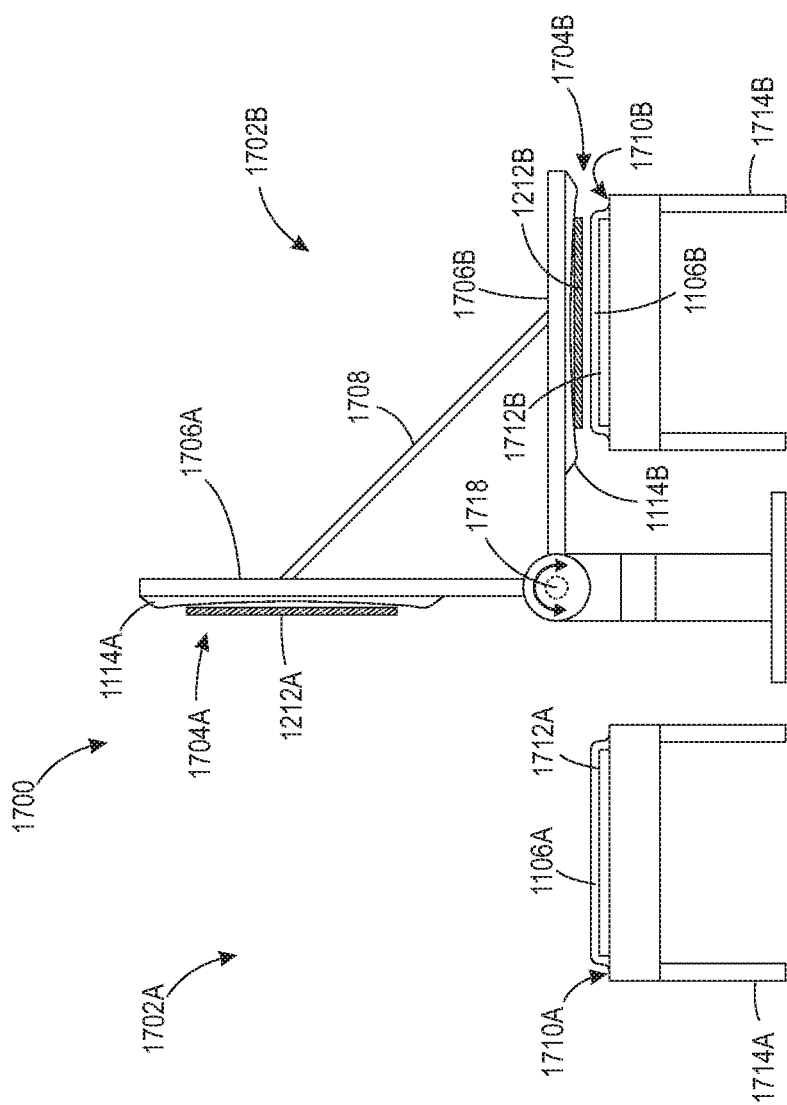
FIG. 18 is a side view of the heater blanket deployment system in a second position, according to the present teachings.

After the first material 1712A is processed at the first working surface 1710A and the second material 1712B has been prepared at the second working surface 1710B, the deployment system 1700 may be rotated and repositioned from a first position of FIG. 17 into a second position of FIG. 18. The processed first material 1712A may be removed from the first working surface 1710A and replaced with an unprocessed material during processing of the second material 1712B. After removal from the first working surface 1710A, the processed first material 1712A may be, for example, used, shipped, further processed, etc.

While FIG. 17 depicts an angle θ of about 90° formed by the first support surface 1706A of the first workstation 1702A and the second support surface 1706B of the second workstation 1702B, it will be appreciated that other angles are contemplated, for example, from about 90° to about 135°.

The deployment system of FIGS. 17 and 18 thus provides two workstations 1702 using a relatively compact work area. The base 1716 positioned between the two workstations 1702 allows equipment that supplies utilities such as power and vacuum to be located close to both workstations and provide utilities to both workstations 1702. Further, one workstation 1702 may be used to process one workpiece 1712 while the other workstation 1702 is used to position and prepare another workpiece 1712 for processing. Because utilities such as power and vacuum may be supplied to only one workstation at a time, the utilities requirements are approximately half compared to a deployment system that processed two workpieces simultaneously.

Figure 19:
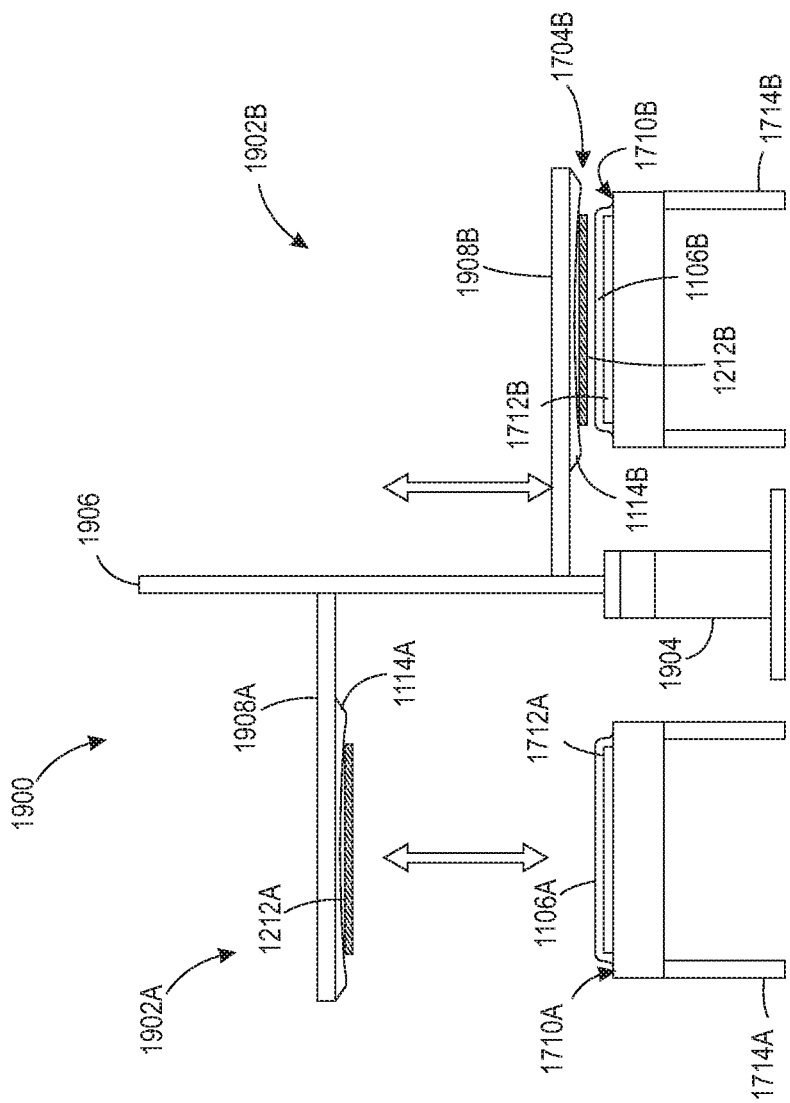
FIG. 19 is a side view of another heater blanket deployment system according to the present teachings.

FIG. 19 depicts another embodiment of a heater blanket deployment system 1900 including a first workstation 1902A and a second workstation 1902B. It will be understood that additional workstations inline with the depicted workstations 1902 are contemplated. The deployment system 1900 of FIG. 19 includes a base 1904 having a vertical tower 1906. The first workstation 1902A includes a first mounting or support surface 1908A movably attached to the vertical tower 1906, and the second workstation 1902B includes a second mounting or support surface 1908B movably attached to the vertical tower 1906. Various mechanical, electrical, electromechanical, manual, and automatic systems for raising and lowering the mounting surfaces 1908 relative to the work surface 1710 are contemplated.

Utilities such as power and vacuum may be routed through the base 1904 and vertical tower 1906 to the heater blankets 1212 and the vacuum bags 1114 of each workstation. In another embodiment, one or more power supplies 502 (FIG. 5) and/or vacuum supplies 1008 (FIG. 10) may be located within the base 1904.

The movable attachment of the support surfaces 1908 to the vertical tower 1906 allows each support surface 1908 for each workstation 1902 to be independently lowered toward, and raised away from, the working surface 1710 and the workpiece 1712. In this embodiment, processing of the workpieces 1712 may occur simultaneously at more than one workstation 1902. Simultaneous processing may require one or more power supplies and vacuum supplies that are rated for a higher output than, for example, the deployment system 1700 of FIG. 17, at least because the power and vacuum draw may be about twice as high. However, positioning the utilities between, and in close proximity to, the two workstations 1902 allows the two workstations 1902 to use the same power and vacuum supplies. This may provide a deployment system 1900 having a reduced part count and equipment cost compared to, for example, two independent workstations having different power and vacuum supplies. Further, a deployment system 1900 that allows simultaneous processing of workpieces 1712 may provide a manufacturing flow having an increase production yield compared to a deployment system that allows serial but not parallel processing of workpieces. Additionally, the FIG. 19 structure is a ridged support structure with a flexible deployment system which does not require a rotating access to the materials being processed and corresponding controls, and thus has the potential for reduced complexity and cost. The heater blankets 1212 and vacuum bags 1114 move vertically toward and away from the materials being processed, and do not sweep horizontally across the materials being processed. However, as with the design of FIGS. 17 and 18, the floor surface under the base 1904 of the FIG. 19 deployment system 1900 would optionally include reinforced concrete and underground utilities routed to the base 1904. As described above, the designs of FIGS. 17-19 include rigid support surfaces to which the heater blankets 1212 and vacuum bags 1114 are attached during use.

Figure 20:
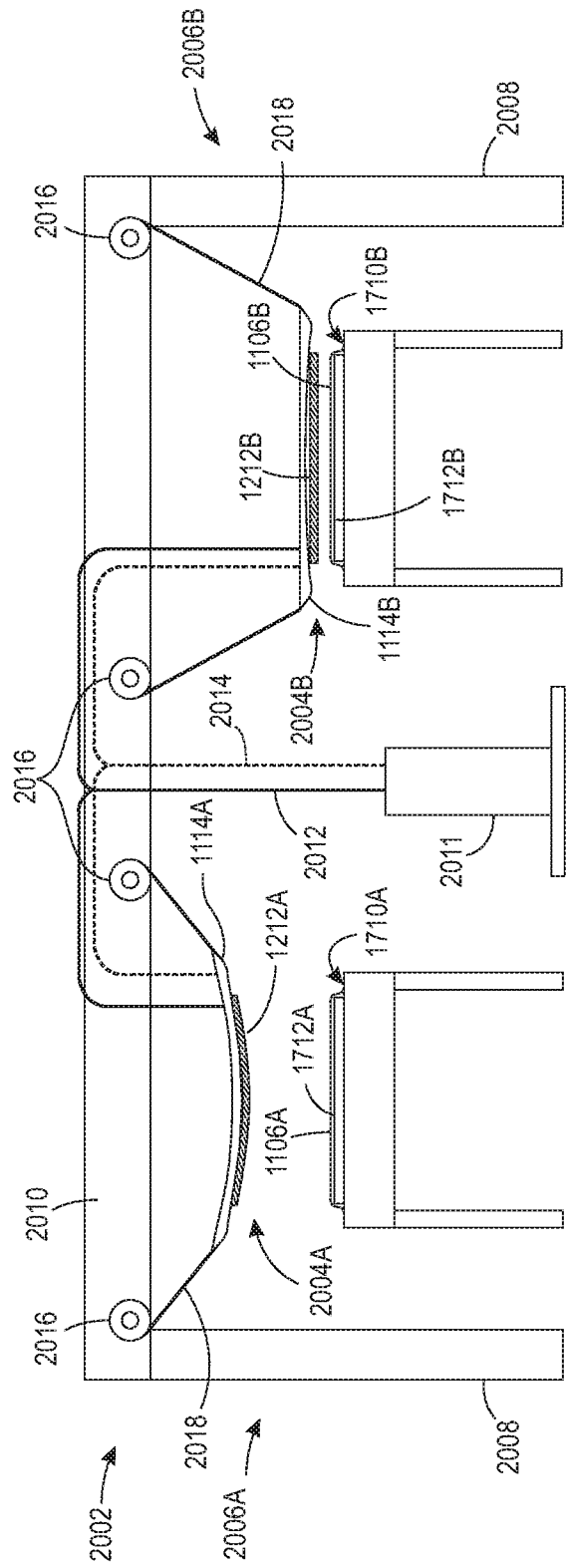
FIG. 20 is a side view of another heater blanket deployment system according to the present teachings.

FIG. 20 depicts another embodiment of a heater blanket deployment system 2000 that includes the use of an overhead system 2002 for suspending a first heater blanket assembly 2004A of a first workstation 2006A and a second heater blanket assembly 2004B of a second workstation 2006B. The overhead system 2002 allows each heater blanket assembly 2004 to be lowered toward and raised away from a working surface 1710 in a vertical direction that is perpendicular to the horizontal working surface 1710. The heater blanket deployment system 2000 of FIG. 20 can include a plurality of vertical supports 2008, an overhead framework 2010 supported by the vertical supports 2008, and an optional base 2011 through which utilities such as power supplied through power cables 2012 and vacuum supplied through vacuum conduits 2014 may be supplied to the heater blanket assemblies 2004.

The deployment system 2000 may further include a plurality of winch assemblies 2016 each configured to independently raise and lower the heater blanket assemblies 2004 by winding and unwinding lifting straps 2018 that are physically attached to the heater blanket assemblies 2004.

The deployment system 2000 provides a rigid framework including the vertical supports 2008 and overhead framework 2010 as a support structure for the flexible lifting straps 2018 and heater blanket assemblies 2004. While FIG. 20 depicts an optional base 2011, utilities such as power 2012 and vacuum 2014 may be routed from another location and across the overhead framework 2010. The base 2011 is optional because it is not needed to support any lifting mechanism for the heater blanket assemblies 2004. Thus heavily reinforced concrete supporting the base 2011 and a heater blanket lifting mechanism may not be required. If the base 2011 is omitted, underground routing of utilities such as power and vacuum to the base 2011 is not required, thereby decreasing construction costs and installation time. The overhead 2010 may also be used to support power cables routed to one or more system power supplies within the base 2011 which are, in turn, routed to the heater blanket assemblies 2004 through power cables 2012.

Further, the deployment system 2000 holds the flexible heater blanket assemblies 2004 in a substantially horizontal position when in both a storage position as depicted by the first workstation 2006A and in a debulk position as depicted by the second workstation 2006B, and each position in between. By holding the heater blanket assemblies in a substantially horizontal position, ridged mounting surfaces 1706, 1908 are required. This allows for flexible heater blanket assemblies 2004 that more easily conform to different and more extreme contours of the workpieces 1712. Further, as the heater blanket assemblies 2004 are lowered onto the workpiece 1712, the heater blanket assembly 2004 physically contacts the center of the workpiece 1712 the drapes over the workpiece from the center outwards. This may reduce or prevent the protective release layer 1106 from moving or shifting during deployment. Because the workpiece 1712 may be tacky when the heater blanket assembly 2004 is lowered onto the workpiece 1712, any lateral movement of the heater blanket assembly 2004 after contact with the workpiece 1712 may detrimentally shift the position of the workpiece 1712. Lowering the heater blanket assembly 2004 onto the workpiece 1712 vertically with an initial center contact with the workpiece 1712 may reduce or prevent lateral movement between, and shifting of, the workpiece 1712 and the heater blanket assembly 2004.

It will be appreciated that the structures described herein as a vacuum bag may be, in some embodiments, a vacuum bag such as a disposable vacuum bag or single-use vacuum bag that provides a vacuum chamber into which the workpiece is inserted and then sealed within during a debulking process (see, for example, the vacuum bag 1006 of FIG. 10). In other embodiments, a vacuum bag may be a vacuum membrane such as a single sheet, or two or more laminated sheets, of pliable material that, together with another structure such as the layup mandrel, form an enclosed and sealed vacuum chamber that is used to provide a vacuum around the workpiece (see, for example, the vacuum membrane 1114 of FIG. 11 and the vacuum membrane 1300 of FIG. 13).

Figure 21:
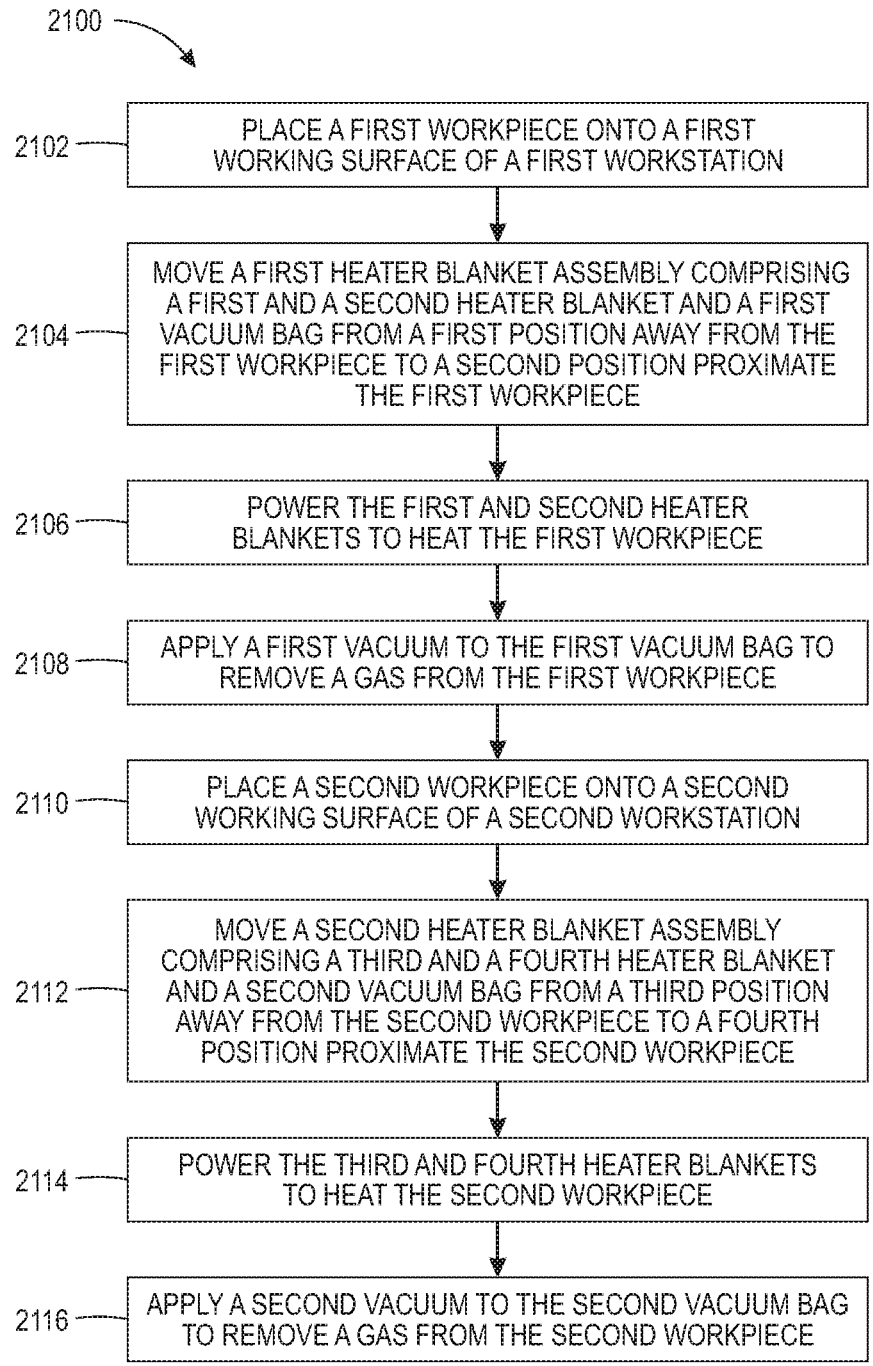
FIG. 21 is a flow chart of a method according to the present teachings.

FIG. 21 is a flow chart depicting a method for processing a first workpiece and a second workpiece 2100 at a deployment system according to an embodiment of the present teachings. At 2102, a first workpiece may be placed onto a first working surface of a first workstation. A first heater blanket assembly including a first smart susceptor heater blanket and a second smart susceptor heater blanket may be moved from a first position away from the first workpiece to a second position proximate the first workpiece, as shown at 2104. Next, at 2106, the first smart susceptor heater blanket and the second smart susceptor heater blanket may be powered to heat the first workpiece. A vacuum may be applied to the first vacuum bag at 2108 to remove a gas such as air, nitrogen, etc., from the first workpiece.

At 2010, a second workpiece may be placed onto a second working surface of a second workstation. A second heater blanket assembly including a third smart susceptor heater blanket and a fourth smart susceptor heater blanket may be moved from a third position away from the second workpiece to a fourth position proximate the second workpiece, as shown at 2112. Next, at 2114, the third smart susceptor heater blanket and the fourth smart susceptor heater blanket may be powered to heat the second workpiece. A vacuum may be applied to the second vacuum bag at 2116 to remove a gas such as air, nitrogen, etc., from the first workpiece.

It will be appreciated that, one or more of the acts depicted herein, for example, in FIG. 21, may be carried out in one or more separate acts and/or phases, and/or in a different order than that depicted.

Figure 22:
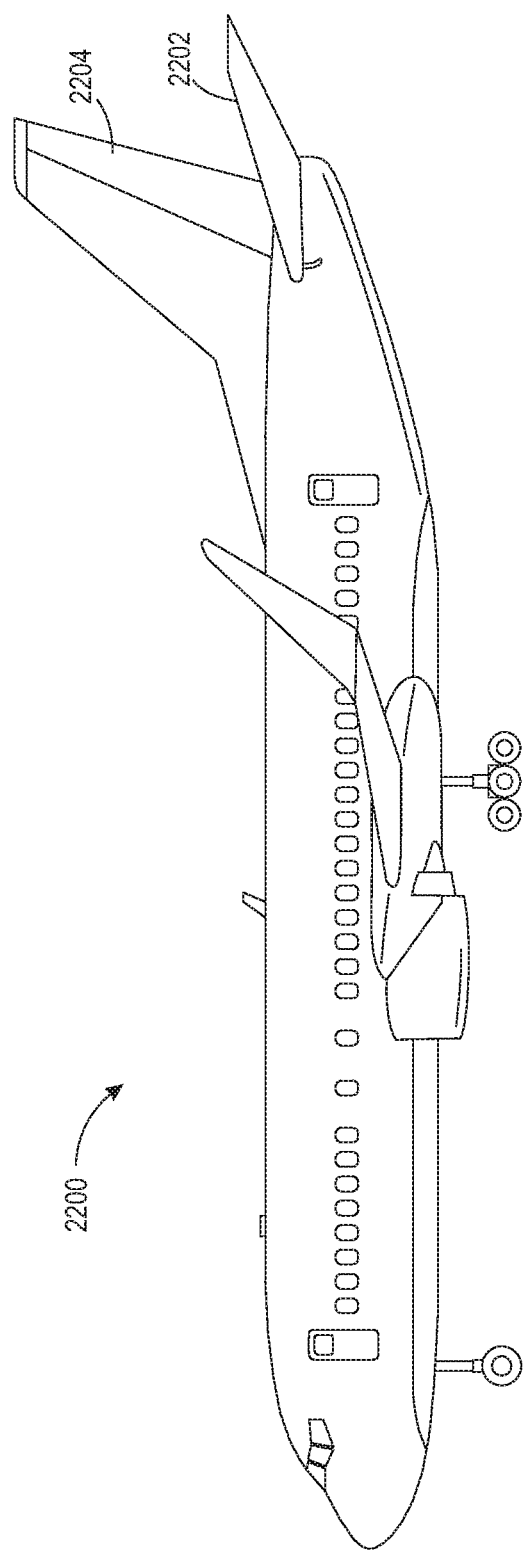
FIG. 22 is a side view of an aircraft including one or more composite parts formed using an embodiment of the present teachings.

The apparatus described herein may be used for debulking of a composite part or for other processing operations. For example, FIG. 22 depicts an aircraft 2200 that includes composite parts that may be debulked or otherwise processed using an embodiment of the present teachings. In one particular used, a horizontal stabilizer 2202, a vertical stabilizer 2204, and/or other aircraft structures may be processed as described above.

The design of the individual smart susceptor heater blankets thus enables the ability to place the heater blankets directly adjacent to one another without causing electromagnetic or thermal interference between heater blankets. Within each wire ribbon, and in the outermost conductors of adjacent wire ribbons, the currents in any two adjacent conductors will, in general, always travel in opposing directions. This ensures that any magnetic field not absorbed by the susceptor windings is minimized by cancellation of an opposing field generated by the two adjacent wires. Other embodiments are contemplated, for example, where the conductors at blanket edges are powered by different power supplies. In general, the heater blankets are relatively large and contain many conductors and so any interference between the outermost conductors on adjacent blankets will be manageably small.

The use of several interconnected heater blankets further allows for debulking or other processing of larger workpieces outside of an autoclave than was previously practical using a single large heater blanket. Damage to a large heater blanket results in the replacement of the entire heater blanket. If damage occurs to one of the heater blankets of the assembly described herein, the modular design using a plurality of heater blankets results in the replacement of only one of the subunits. Further, the high current and voltage needed to drive a plurality of litz wires within single large blanket is expensive and hazardous to manufacturing personnel. Powering multiple heater blankets using multiple power supplies allows for use of lower current and voltages, which improve safety for manufacturing personnel.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g.—1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A heater blanket deployment system, comprising:
   a first workstation, comprising:
      a first heater blanket assembly comprising a first smart susceptor heater blanket and a second smart susceptor heater blanket, wherein the second smart susceptor heater blanket is positioned adjacent to the first smart susceptor heater blanket;
      a first layup mandrel configured to receive a first workpiece during processing by the first workstation; and
      a first vacuum bag attached to the first and second smart susceptor heater blankets; and
   a second workstation, comprising:

a second heater blanket assembly comprising a third smart susceptor heater blanket and a fourth smart susceptor heater blanket, wherein the fourth smart susceptor heater blanket is positioned adjacent to the third smart susceptor heater blanket;
a second layup mandrel configured to receive a second workpiece during processing by the second workstation; and
a second vacuum bag attached to the third and fourth smart susceptor heater blankets; and
a frame comprising:
a first support surface supporting the first heater blanket assembly; and
a second support surface supporting the second heater blanket assembly; and
at least one power supply configured to supply power to the first workstation and to the second workstation;
wherein the frame is configured such that:
the first heater blanket assembly can move toward the first layup mandrel of the first workstation only when the second heater blanket assembly is moving away from the second layup mandrel of the second workstation; and
the second heater blanket assembly can move toward the second layup mandrel only when the first heater blanket assembly is moving away from the first layup mandrel.

2. The heater blanket deployment system of claim 1, wherein the frame further comprises a strut that physically connects the first and second support surfaces and the first and second heater blanket assemblies together in a fixed position relative to each other.

3. The heater blanket deployment system of claim 2, configured such that a first workpiece can be processed at the first workstation only when a second workpiece at the second workstation is not being processed.

4. The heater blanket deployment system of claim 2, the frame further comprising:
a base mechanically coupled to the first support surface and to the second support surface; and
a rod coupled to the base, wherein:
the first support surface and the second support surface are rotatably attached to the rod and configured to maintain an angle of from 90° to 135° formed by the first support surface and the second support surface while rotating; and
the first support surface, the second support surface, and the base form a Y-shaped frame.

5. The heater blanket deployment system of claim 1, further comprising a first plurality of lifting straps attached to the first vacuum bag and a second plurality of lifting straps attached to the second vacuum bag, wherein the frame is configured to lower the first heater blanket assembly toward, and raise the first heater blanket assembly away from, the first layup mandrel using the first plurality of lifting straps, and is further configured to lower the second heater blanket assembly toward, and raise the second heater blanket assembly away from, the second layup mandrel using the second plurality of lifting straps.

6. The heater blanket deployment system of claim 1, wherein:
the first workstation is configured such that the first vacuum bag overlies the first layup mandrel during processing of the first workpiece;
the second workstation is configured such that the second vacuum bag overlies the second layup mandrel during processing of the second workpiece; and the heater blanket deployment system further comprises a vacuum supply in fluid communication with the first vacuum bag and the second vacuum bag.

7. The heater blanket deployment system of claim 6, further comprising at least a first elongated seal configured to maintain a first vacuum between the first heater blanket assembly and the first layup mandrel and at least a second elongated seal configured to maintain a second vacuum between the second heater blanket assembly and the second layup mandrel.

8. The heater blanket deployment system of claim 1, further comprising a first protective release layer that overlies the first smart susceptor heater blanket and the second smart susceptor heater blanket, and a second protective release layer that overlies the third smart susceptor heater blanket and the fourth smart susceptor heater blanket.

9. The heater blanket deployment system of claim 8, wherein the first protective release layer is positioned between the first smart susceptor heater blanket and the first layup mandrel, and the second protective release layer is interposed between the third smart susceptor heater blanket and the second layup mandrel.

10. The heater blanket deployment system of claim 1, wherein:
the first smart susceptor heater blanket comprises a first wire assembly comprising a first susceptor wire wrapped around a first litz wire and a first thermally conductive and electrically insulative first binder; and
the second smart susceptor heater blanket comprises a second wire assembly comprising second susceptor wire wrapped around a second litz wire and a second thermally conductive and electrically insulative second binder.

11. The heater blanket deployment system of claim 10, further comprising:
a first wire ribbon comprising the first wire assembly, the first wire ribbon having a first length from a first connector to a second connector; and
a second wire ribbon comprising the second wire assembly, the second wire ribbon having a second length from a third connector to a fourth connector.

12. The heater blanket deployment system of claim 11, wherein the first length varies from the second length by no more than ±20%.

13. A heater blanket deployment system, comprising:
a first workstation, comprising:
a first heater blanket assembly comprising a first smart susceptor heater blanket and a second smart susceptor heater blanket positioned adjacent to the first smart susceptor heater blanket;
a first vacuum bag attached to the first and second smart susceptor heater blankets; and
a first layup mandrel configured such that during processing of a first workpiece, the first smart susceptor heater blanket, the second smart susceptor heater blanket, and the first vacuum bag overlie the first layup mandrel; and
a second workstation, comprising:
a second heater blanket assembly comprising a third smart susceptor heater blanket and a fourth smart susceptor heater blanket positioned adjacent to the third smart susceptor heater blanket;
a second vacuum bag attached to the third and fourth smart susceptor heater blankets; and
a second layup mandrel configured such that during processing of a second workpiece, the third smart susceptor heater blanket and the fourth smart susceptor heater blanket overlie the second layup mandrel; and a frame, comprising:
- a first support surface supporting the first heater blanket assembly;
- a second support surface supporting the second heater blanket assembly; and
- a frame assembly configured such that the first and second smart susceptor heater blankets can move toward the first layup mandrel only when the frame assembly moves the third and fourth smart susceptor heater blankets away from the second layup mandrel, and the frame assembly is further configured to move the third and fourth smart susceptor heater blankets toward the second layup mandrel only when the frame assembly moves the first and second smart susceptor heater blankets away from the first layup mandrel; and at least one power supply configured to supply power to the first workstation and to the second workstation.

14. The heater blanket deployment system of claim 13, wherein the frame assembly is a Y-shaped frame assembly that positions the first and second heater smart susceptor heater blankets in fixed relationship relative to each other, and further positions the third and fourth smart susceptor heater blankets in fixed relationship relative to each other and to the first and second smart susceptor heater blankets.

15. The heater blanket deployment system of claim 13, wherein the frame comprises a plurality of winches configured to lower the first heater blanket assembly toward the first layup mandrel only when raising the second heater blanket assembly away from the second layup mandrel, and further configured to lower the second heater blanket assembly only when raising the first heater blanket assembly away from the first layup mandrel.

16. The heater blanket deployment system of claim 15, further comprising a plurality of lifting straps attached to one of the first heater blanket assembly and the second heater blanket assembly, wherein the plurality of winches are configured to lower the first heater blanket assembly toward, and raise the first heater blanket assembly away from, the first layup mandrel using the plurality of lifting straps, and are further configured to lower the second heater blanket assembly toward, and raise the second heater blanket assembly away from, the second layup mandrel using the plurality of lifting straps.

17. The heater blanket deployment system of claim 13, further comprising at least a first elongated seal configured to maintain a first vacuum between the first heater blanket assembly and the first layup mandrel and at least a second elongated seal configured to maintain a second vacuum between the second heater blanket assembly and the second layup mandrel.

18. The heater blanket deployment system of claim 13, wherein a portion of the frame is physically positioned between the first workstation and the second workstation.

19. The heater blanket deployment system of claim 1, wherein:
- the first and second heater blankets are positioned between the first vacuum bag and the first layup mandrel during processing of a first workpiece at the first workstation;
- the first workstation comprises:
  - a first vacuum port that extends through the first vacuum bag; and
  - a first vacuum hose having a first end connected to the frame and a second end connected to the first vacuum port;
- the third and fourth heater blankets are positioned between the second vacuum bag and the second layup mandrel during processing of a second workpiece at the second workstation; and
- the second workstation comprises:
  - a second vacuum port that extends through the second vacuum bag; and
  - a second vacuum hose having a first end connected to the frame a second end connected to the second vacuum port.

20. The heater blanket deployment system of claim 13, further comprising a strut that physically connects the first support surface to the second support surface in a fixed position relative to each other wherein, in the fixed position, the first and second support surfaces form an angle of from 90° to 135°.

* * * * *